United States Patent
Sakai et al.

(10) Patent No.: US 12,003,791 B2
(45) Date of Patent: Jun. 4, 2024

(54) CONTROL METHOD FOR SERVER APPARATUS, DELIVERY SYSTEM, AND RECORDING MEDIUM

(71) Applicant: Konami Digital Entertainment Co., Ltd., Tokyo (JP)

(72) Inventors: Akira Sakai, Tokyo (JP); Shigeru Chiba, Tokyo (JP); Kai Inoue, Tokyo (JP); Junki Hirai, Tokyo (JP); Jun Murai, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 17/569,577

(22) Filed: Jan. 6, 2022

(65) Prior Publication Data

US 2022/0132186 A1   Apr. 28, 2022

Related U.S. Application Data

(63) Continuation of application No. PCT/JP2020/026719, filed on Jul. 8, 2020.

(30) Foreign Application Priority Data

Jul. 8, 2019  (JP) .................................. 2019-126848

(51) Int. Cl.
*H04N 21/43* (2011.01)
*A63F 13/61* (2014.01)
(Continued)

(52) U.S. Cl.
CPC ....... *H04N 21/23424* (2013.01); *A63F 13/61* (2014.09); *H04N 21/2668* (2013.01); *H04N 21/812* (2013.01)

(58) Field of Classification Search
CPC ......... H04N 21/23424; H04N 21/2668; H04N 21/812; H04N 21/25883; H04N 21/4781;
(Continued)

(56) References Cited

U.S. PATENT DOCUMENTS

2006/0105841 A1* 5/2006 Rom ....................... A63F 13/35
                                                       463/42
2007/0255621 A1* 11/2007 Mason ............... G06Q 30/0243
                                                      705/14.54
(Continued)

FOREIGN PATENT DOCUMENTS

| JP | 2016-189803 A | 11/2016 |
| JP | 6428955 B1 | 11/2018 |
| JP | 2019-40599 A | 3/2019 |

OTHER PUBLICATIONS

International Search Report dated Oct. 13, 2020 from the International Searching Authority in International Application No. PCT/JP2020/026719.
(Continued)

*Primary Examiner* — Timothy R Newlin
(74) *Attorney, Agent, or Firm* — Sughrue Mion, PLLC

(57) ABSTRACT

A program recorded on a computer-readable recording medium causes a processor of a server apparatus communicable with a game apparatus capable of executing a game and delivering a video to a terminal apparatus, to perform a method of: acquiring, from a game apparatus that executes a game, video information indicating a game video of the game; and delivering, to the terminal apparatus, the game video indicated by the video information. The delivering includes, with the game apparatus having generated specific information indicating that the game video is a specific video, delivering to the terminal apparatus a specific advertisement for a specific commercial item associated with the
(Continued)

specific video in response to acquiring the video information and the specific information from the game apparatus.

20 Claims, 12 Drawing Sheets

(51) Int. Cl.
  *H04N 21/234* (2011.01)
  *H04N 21/2668* (2011.01)
  *H04N 21/81* (2011.01)
(58) Field of Classification Search
  CPC ............ H04N 21/25866; H04N 21/258; A63F 13/61; A63F 13/35; A63F 13/86; A63F 13/79; A63F 13/77; A63F 2300/51; A63F 2300/5506; A63F 2300/53; G06Q 30/02; G06Q 30/0241
  See application file for complete search history.

(56) References Cited

U.S. PATENT DOCUMENTS

| | | | | |
|---|---|---|---|---|
| 2009/0054117 | A1* | 2/2009 | Beser | A63F 13/52 463/43 |
| 2010/0016080 | A1* | 1/2010 | Garden | A63F 13/30 463/43 |
| 2010/0174593 | A1* | 7/2010 | Cao | A63F 13/12 705/14.12 |
| 2012/0100915 | A1* | 4/2012 | Margalit | A63F 13/61 463/31 |
| 2012/0101895 | A1* | 4/2012 | Banham | G06Q 30/0251 705/14.49 |
| 2012/0157190 | A1* | 6/2012 | Hungate | G06Q 30/0207 463/25 |
| 2013/0344966 | A1* | 12/2013 | Mustafa | A63F 13/79 463/42 |
| 2017/0330228 | A1* | 11/2017 | Kim | A63F 13/61 |
| 2018/0056190 | A1* | 3/2018 | Ahn | G06Q 30/0272 |
| 2018/0060906 | A1* | 3/2018 | Park | G06T 7/70 |
| 2019/0068916 | A1* | 2/2019 | Arora | H04N 7/013 |

OTHER PUBLICATIONS

International Preliminary Report on Patentability with the translation of Written Opinion dated Jan. 11, 2022 from the International Bureau in International Application No. PCT/JP2020/026719.
Office Action dated Oct. 5, 2021 from the Japanese Patent Office in Japanese Application No. 2019-126848.
Office Action dated Nov. 24, 2021 from the Japanese Patent Office in Japanese Application No. 2019-126847.
Office Action dated Feb. 22, 2022 from the Japanese Patent Office in Japanese Application No. 2019-126848.
Office Action dated Jun. 6, 2023 in Japanese Application No. 2022-108899.
Korean Office Action dated Jan. 29, 2024 in Application No. 10-2022-7003641.

* cited by examiner

| VIDEO ID | VIDEO SPECIFIC INFO JX ||| ADVERTISEMENT INFORMATION TO BE DELIVERED JY |
|---|---|---|---|---|
| | GAME ID | MODE ID | TOURNAMENT ID | |
| m001 | g001 | x011 | y001 | k001 k002 |
| m002 | g001 | x012 | y002 | k003 |
| m003 | g002 | x021 | y001 | k001 k002 |
| m004 | g002 | x022 | Null | k004 |
| m005 | g003 | Null | Null | k005 |
| m006 | g004 | Null | y003 | k006 |
| m007 | Null | Null | Null | k001 k007 k008 |
| ⋮ | ⋮ | ⋮ | ⋮ | ⋮ |

FIG. 10

| Ad ID | ADVERTISEMENT DELIVERY INFO JH |||||||||| TBL2 |
|---|---|---|---|---|---|---|---|---|---|---|
| | COMMERCIAL ITEM INFO JS || BANNER ADVERTISEMENT DELIVERY INFO JB ||| VIDEO ADVERTISEMENT DELIVERY INFO JD ||||| |
| | | | | | | IMAGE ADVERTISEMENT DELIVERY INFO |||| AUDIO ADVERTISEMENT DELIVERY INFO || |
| | COMMERCIAL ITEM ID | COMMERCIAL ITEM NAME | BANNER ID | BANNER FILE INFO | BANNER LINK INFO | IMAGE ID | IMAGE FILE INFO | IMAGE POSITION INFO | AUDIO ID | AUDIO FILE INFO | |
| k001 | s001 | Refreshing Cider | b001 | 001.gif | www.aa.com | d001 | 101.gif | (25, 32) | n001 | 201.mp3 | |
| k002 | s002 | Fresh Bread | b002 | 002.gif | www.bb.com | d002 | 102.gif | (26, 12) | n002 | Null | |
| k003 | s003 | Okinawa Trip | b003 | 003.gif | www.cc.com | d003 | Null | Null | n003 | 203.mp3 | |
| ... | ... | ... | ... | ... | ... | ... | ... | ... | ... | ... | |

FIG. 11

TBL3

| VIEWER ID | VIEWER ACCESS INFO | VIEWER INFO | | |
|---|---|---|---|---|
| | | Age | Gender | Region |
| y001 | tanaka77 | 30 | M | Tokyo |
| y002 | suzuki01 | 15 | F | Osaka |
| y003 | takuya | 25 | M | Kanagawa |
| ⋮ | ⋮ | ⋮ | ⋮ | ⋮ |

FIG. 12

TBL4

| Ad ID | ADVERTISEMENT TARGET USER INFO | | |
|---|---|---|---|
| | ADVERTISEMENT TARGET AGE INFO | ADVERTISEMENT TARGET GENDER INFO | ADVERTISEMENT TARGET REGION INFO |
| k001 | 20-40 | M | Tokyo, Chiba, Kanagawa, ⋯ |
| k002 | 10-60 | M, F | Osaka, Kyoto, Kobe, ⋯ |
| k003 | 18-50 | F | Tokyo, Chiba, Kanagawa, ⋯ |
| ⋮ | ⋮ | ⋮ | ⋮ |

CONTROL METHOD FOR SERVER APPARATUS, DELIVERY SYSTEM, AND RECORDING MEDIUM

CROSS REFERENCE TO RELATED APPLICATIONS

This application is a Continuation application of PCT Application No. PCT/JP2020/026719, filed Jul. 8, 2020, and is based on and claims priority from Japanese Patent Application No. 2019-126848, filed Jul. 8, 2019, the entire contents of each of which are incorporated herein by reference.

BACKGROUND

Field of the Invention

The present invention relates to a server apparatus, to a control method for a server apparatus, to a delivery system, and to a recording medium.

Description of Related Art

In recent years, technology relating to server apparatuses for delivering advertisements to terminal apparatuses is widely known. For example, Japanese Patent Application Laid-Open Publication No. 2019-040599 describes a technology relating to a server apparatus that determines the contents of an advertisement to be delivered to a terminal apparatus based on age, gender, location, etc., of a user of the terminal apparatus, and delivers the advertisement of the determined contents to the terminal apparatus.

It may be desired to deliver to a terminal apparatus an advertisement associated with a video being played on a terminal apparatus while the terminal apparatus is playing the video. According to conventional technology, however, since the content of the advertisement is determined without considering the content of the video being played on the terminal apparatus, an advertisement not related to the video being played on the terminal apparatus may be delivered to the terminal apparatus.

SUMMARY

The present invention was made in consideration of the above-described circumstances, and one of the objects is to provide techniques to enable delivery of an advertisement that takes into account video being played on a terminal apparatus.

In order to solve the above problem, a recording medium of the present invention is a non-transitory computer-readable recording medium storing a program executable by one or more processors of a server apparatus that delivers a video to a terminal apparatus and is communicable with a game apparatus that executes a game, to perform a method of: acquiring, from a game apparatus that executes a game, video information indicating a game video of the game; and delivering, to the terminal apparatus, the game video indicated by the video information. The delivering includes, with the game apparatus having generated specific information indicating that the game video is a specific video, delivering to the terminal apparatus a specific advertisement for a specific commercial item associated with the specific video in response to acquiring the video information and the specific information from the game apparatus.

A delivery system according to one aspect of the present invention is a delivery system that includes a game apparatus that executes a game; and a server apparatus communicable with the game apparatus and configured to deliver a video to a terminal apparatus. The game apparatus includes: one or more apparatus memories; and one or more apparatus processors communicatively connected to the one or more apparatus memories and configured to execute instructions to: generate video information indicating a game video of the game; and with the game video being a specific video, generate specific information indicating that the game video is the specific video. The server apparatus includes: one or more server memories; and one or more server processors communicatively connected to the one or more server memories and configured to execute instructions to: acquire the video information and the specific information from the game apparatus; and deliver the game video indicated by the video information to the terminal apparatus, and in response to acquiring the video information and the specific information from the game apparatus, the one or more server processors further execute the instructions to, in delivery of the game video, deliver to the terminal apparatus a specific advertisement for a specific commercial item associated with the specific video.

In addition, a server apparatus according to one aspect of the present invention is a server apparatus that delivers a video to a terminal apparatus, the server apparatus being communicable with a game apparatus that executes a game, and the server apparatus includes: one or more server memories; and one or more server processors communicatively connected to the one or more server memories and configured to execute instructions to: acquire, from the game apparatus, video information indicating a game video of the game; and deliver to a terminal apparatus the game video indicated by the video information. With the game apparatus having generated specific information indicating that the game video is a specific video, the one or more server processors further execute the instructions to, in delivery of the game video, deliver to the terminal apparatus a specific advertisement for a specific commercial item associated with the specific video in response to acquiring the video information and the specific information from the game apparatus.

Also, a control method for a server apparatus in accordance with one aspect of the present invention is a control method for a server apparatus that delivers a video to a terminal apparatus, the server apparatus having one or more server processors and being communicable with a game apparatus that executes a game. The control method includes: causing the one or more server processors to acquire, from the game apparatus, video information indicating a game video of the game; and causing the one or more server processors to deliver, to a terminal apparatus, the game video indicated by the video information, and the control method further includes causing the one or more server processors to, with the game apparatus having generated specific information indicating that the game video is a specific video, deliver to the terminal apparatus, in delivery of the game video, a specific advertisement for a specific commercial item associated with the specific video in response to acquiring the video information and the specific information from the game apparatus.

BRIEF DESCRIPTION OF THE DRAWINGS

FIG. 10 is a diagram showing an example data configuration of an advertisement management table TBL2.

FIG. 11 is a diagram showing an example data configuration of a viewer management table TBL3.

FIG. 12 is a diagram showing an example data configuration of an advertisement target user information table TBL4.

DESCRIPTION OF THE EMBODIMENTS

Figure 1:
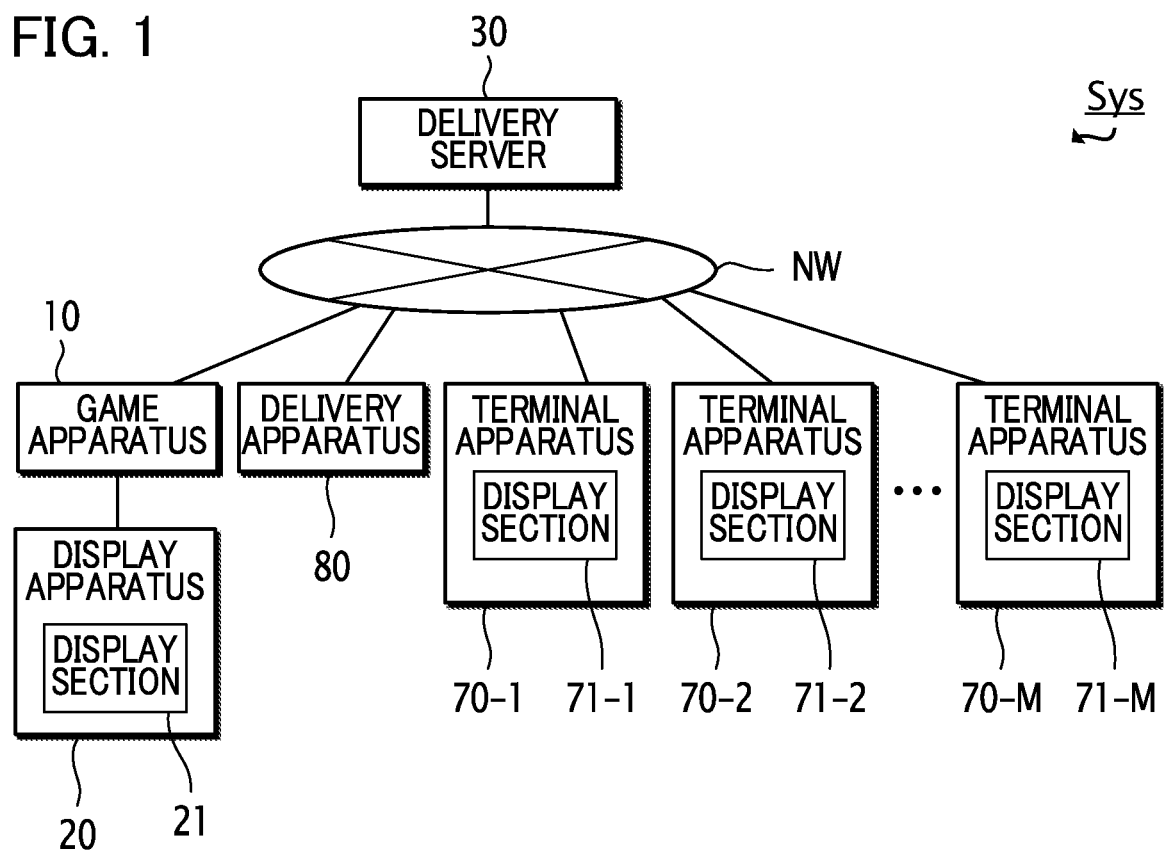
FIG. 1 is an explanatory diagram of an overview of an example video delivery system Sys according to an embodiment of the present invention.

In the following, modes for carrying out the present invention will be described with reference to the drawings. In the drawings, the dimensions and scales of elements may be different from those of actual configurations, as appropriate. The embodiments described below are preferred specific examples of the present invention. Therefore, various technically preferable limitations are included in the embodiments. However, the scope of the present invention is not limited to the embodiments unless otherwise described to specifically limit the present invention.

A. Embodiment

In the following, description will be given of the embodiments of the present invention.

1. Overview of Video Delivery System

FIG. 1 is an explanatory diagram for explaining an overview of a video delivery system (video streaming system) Sys of the present embodiment. The overview of the video delivery system Sys is described below with reference to FIG. 1.

As shown in FIG. 1, the video delivery system Sys includes a game apparatus 10 capable of executing a baseball game (an example of "game"); a delivery server 30 (an example of a "server apparatus") communicable with the game apparatus 10 via a network NW; a plurality of terminal apparatuses 70-1 to 70-M communicable with the delivery server 30 via the network NW; and one or more delivery apparatuses 80 communicable with the delivery server 30 via the network NW (M is a natural number of two or more). In the following, the m-th terminal apparatus 70 from among the plurality of terminal apparatuses 70-1 to 70-M may be referred to as a terminal apparatus 70-$m$ ($m$ is a natural number satisfying $1 \leq m \leq M$).

In the present embodiment, the game apparatus 10 can display a video of a baseball game that is being executed in the game apparatus 10 on a display section 21 provided in a display apparatus 20 communicable with the game apparatus 10. In the following, the video of a baseball game that is displayed by the game apparatus 10 on the display section 21 may be referred to as a game video for display HMV (see FIG. 2). In the present embodiment, the game video for display HMV may be a still image for display that is updated every unit period (e.g., a period of 1/60 of a second). The still image for display is a still image that is displayed on the display section 21 in each unit period. In the present embodiment, the game apparatus 10 can supply to the delivery server 30 a video of a baseball game that is being executed in the game apparatus 10. In the following, the video of the baseball game supplied by the game apparatus 10 to the delivery server 30 may be referred to as a game video for delivery MV (see FIG. 3). In the present embodiment, the game video for delivery MV is an example of a "game video". In the present embodiment, the game video for delivery MV may be a still image for delivery that is updated every unit period. Here, the still image for delivery is a still image supplied by the game apparatus 10 to the delivery server 30 in each unit period. In the present embodiment, it is assumed that the game video for delivery MV is a video generated based on the game video for display HMV. It is assumed here that the game video for delivery MV has a lower resolution than the game video for display HMV. However, the present invention is not limited thereto. For example, the game video for delivery MV may be the same video as the game video for display HMV.

In the present embodiment, it is assumed as an example that the game apparatus 10 is a home game apparatus. However, any information processing apparatus may be employed as the game apparatus 10. For example, the game apparatus 10 may be a commercial game apparatus installed in a store or an amusement facility, a mobile device such as a portable phone or a smart phone, or a stationary information apparatus such as a personal computer.

In the present embodiment, the delivery apparatus 80 can supply to the delivery server 30, for example, a video created by a user of the delivery apparatus 80. In the following, as an example, it is assumed that the delivery apparatus 80 supplies a video of music (hereinafter referred to as a "music video") to the delivery server 30. In the following, the game video for delivery MV and the music video may be collectively referred to as a delivery video.

In the present embodiment, the delivery server 30 delivers, to the terminal apparatus 70-$m$, a delivery video supplied from the game apparatus 10 or the delivery apparatus 80 in response to a supply of the delivery video from the game apparatus 10 or the delivery apparatus 80 and in response to a receipt of a delivery request for the delivery video from the terminal apparatus 70-$m$. In addition, in response to a receipt, from the terminal apparatus 70-$m$, of a delivery request to deliver a video delivery screen GG for displaying delivery videos, the delivery server 30 delivers the video delivery screen GG to the terminal apparatus 70-$m$ (see FIG. 3).

As shown in FIG. 1, the terminal apparatus 70-$m$ comprises a display section 71-$m$. In response to a receipt of a delivery video from the delivery server 30, the terminal apparatus 70-$m$ displays the delivery video on the display section 71-$m$. As the terminal apparatus 70-$m$, any information processing apparatus that can be connected to the Internet, such as a smart phone, a mobile phone, or a personal computer, can be employed.

2. Overview of Videos Generated in Video Delivery System

In the following, various videos generated in the video delivery system Sys will be described with reference to FIGS. 2 to 4.

Figure 2:
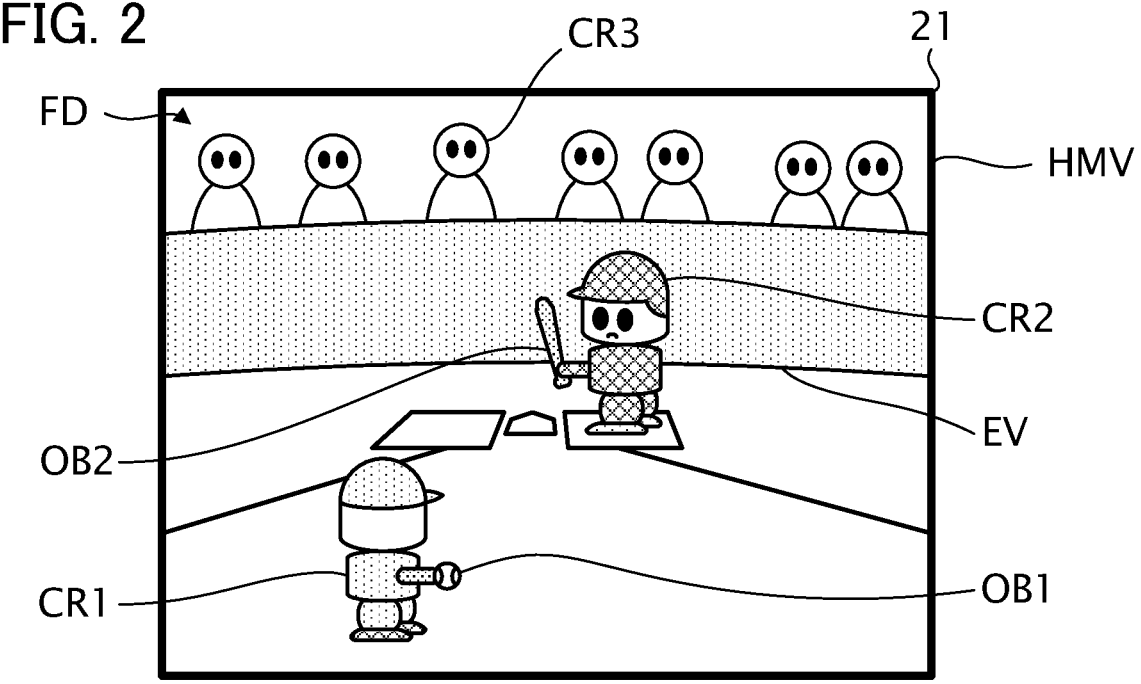
FIG. 2 is an explanatory diagram of an example game video for display HMV.

FIG. 2 is an explanatory diagram for explaining an example of an overview of a game video for display HMV, generated by the game apparatus 10.

As shown in FIG. 2, a game video for display HMV in the present embodiment is a video showing how a baseball game is progressing in a virtual space FD, such as a virtual baseball field. Specifically, the game video for display HMV in the present embodiment shows, for example, a pitcher character CR1 pitching a ball object OB1 and a batter character CR2 hitting the ball object OB1 pitched by the pitcher character CR1, using a bat object OB2 in the virtual space FD. The game video for display HMV also shows, for example, audience characters CR3 watching a baseball game in the virtual space FD.

Figure 3:
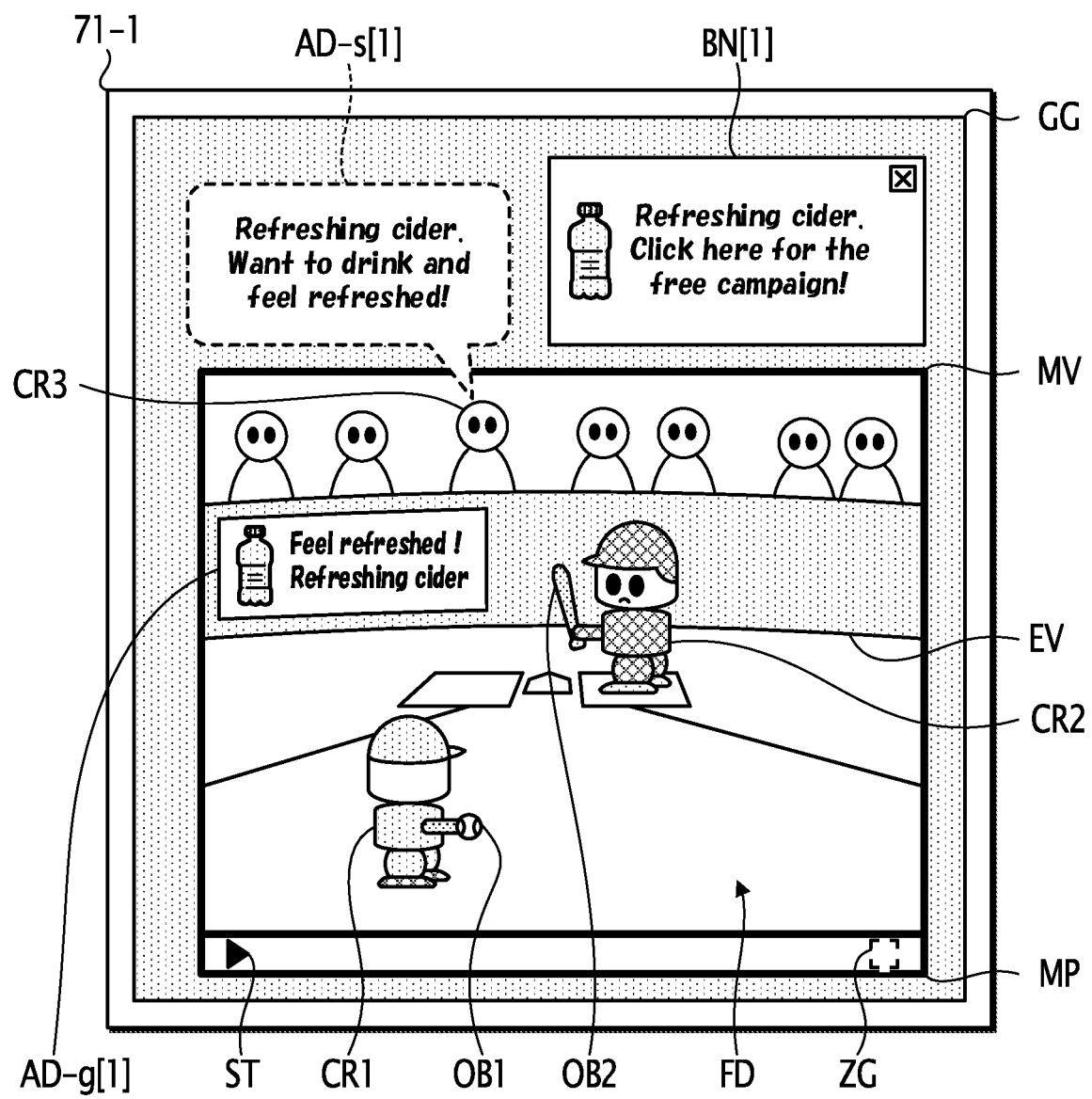
FIG. 3 is an explanatory diagram of an example a video delivery screen GG.
Figure 4:
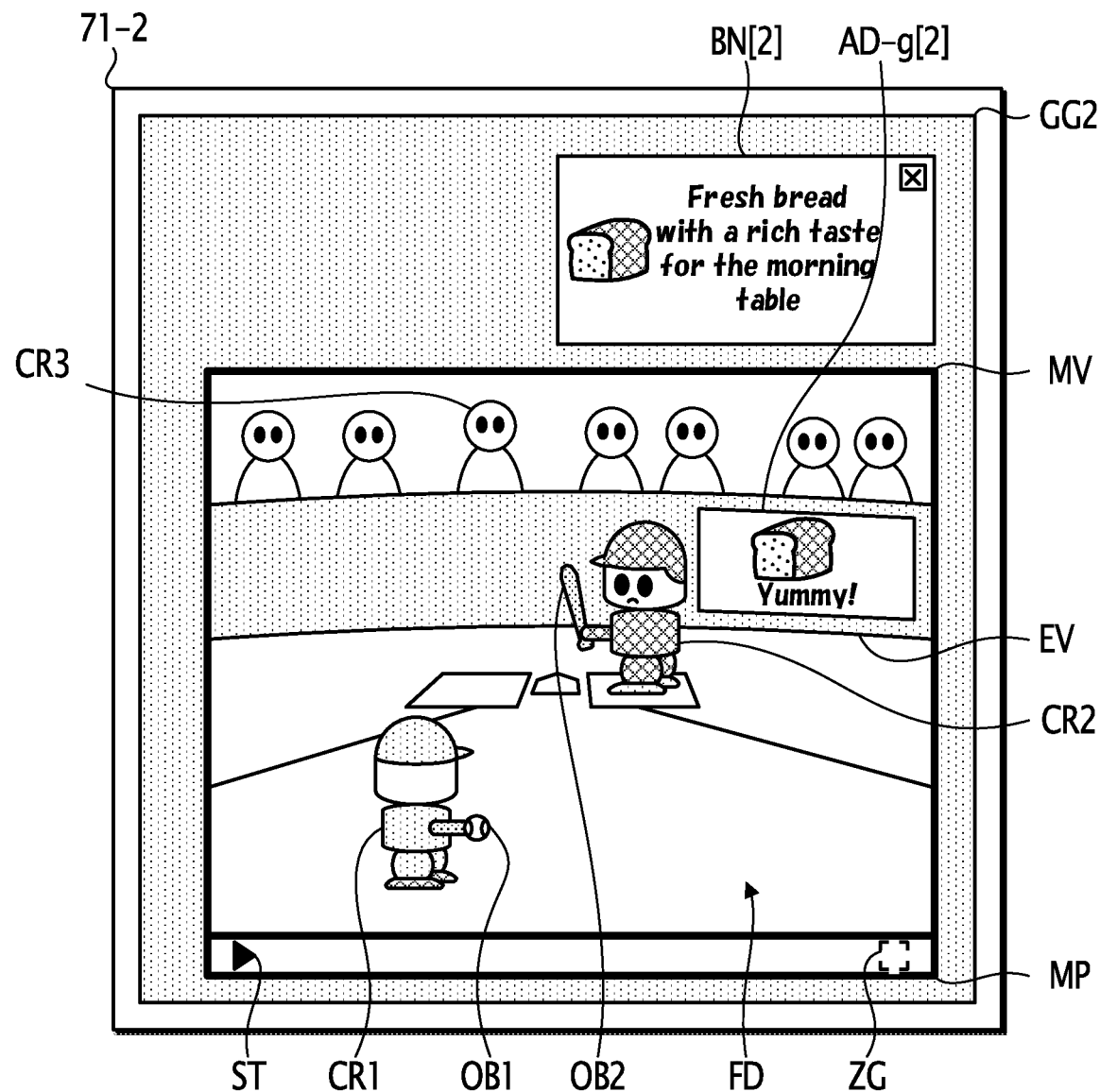
FIG. 4 is an explanatory diagram of an example a video delivery screen GG.

FIGS. 3 and 4 are explanatory diagrams for explaining an example of an overview of a video delivery screen GG, which is supplied by the delivery server 30 to the terminal apparatus 70-$m$.

As shown in FIGS. 3 and 4, the video delivery screen GG includes a video player part MP. The video player part MP has a play start button ST, and plays a delivery video when the game apparatus 10 or the delivery apparatus 80 is supplying the delivery video to the delivery server 30, or in response to the play start button ST being pressed after the game apparatus 10 or the delivery apparatus 80 has completed supplying the delivery video to the delivery server 30. The video player part MP also has a full screen display button ZG. In response to the full screen display button ZG being pressed at a timing during a period in which the video player part MP is playing the delivery video, the size of the video player part MP is increased to fill the entire display section 71-$m$.

In addition, the delivery server 30 of the present embodiment can deliver advertisements for goods or services to the terminal apparatus 70-$m$. In the following, the goods and services may be collectively referred to as commercial items GD. Specifically, the delivery server 30 of the present embodiment can deliver to the terminal apparatus 70-$m$ an advertisement pertaining to one or more commercial items GD, selected from among Q commercial items GD[1] to GD[Q] (Q is a natural number of two or more).

In the present embodiment, it is assumed that the delivery server 30 provides two delivery modes of advertisements pertaining to a commercial item GD[$q$], for the terminal apparatus 70-$m$, one delivery mode being a delivery by a banner image BN[$q$] and the other being a delivery by a video advertisement AD[$q$] ($q$ is a natural number satisfying $1 \leq q \leq Q$).

Specifically, the delivery server 30 can have the video delivery screen GG, which is delivered to the terminal apparatus 70-$m$, include a banner image BN[$q$] pertaining to the commercial item GD[$q$], as shown in FIGS. 3 and 4. The banner image BN[$q$] is a still image or a video separate from the delivery video, and is a still image or a video pertaining to the commercial item GD[$q$]. In the present embodiment, the delivery server 30 positions the banner image BN[$q$] in, of the video delivery screen GG, an area that is different from an area in which the video player part MP is displayed. However, the present invention is not limited to such a manner, and the delivery server 30 may overlay the banner image BN[$q$] on the area in which the video player part MP is displayed of the video delivery screen GG, for example, as a pop-up image.

Also, as shown in FIGS. 3 and 4, the delivery server 30 is able to incorporate a video advertisement AD[$q$] pertaining to the commercial item GD[$q$] in the delivery video delivered to the terminal apparatus 70-$m$. Here, the video advertisement AD[$q$] is a still image or a video image in which a part of the delivery video is changed, or audio incorporated into the delivery video to be played by the video player part MP together with the delivery video. In the following, when the video advertisement AD[$q$] is a still image or a video that is a changed part of the delivery video, the video advertisement AD[$q$] may be referred to as an image advertisement AD-g[$q$]. Also, in the following, when the video advertisement AD[$q$] is an audio played together with the delivery video, the video advertisement AD[$q$] may be referred to as an audio advertisement AD-s[$q$].

FIG. 3 illustrates a case in which a banner image BN[1] pertaining to the commercial item GD[1] is arranged in a video delivery screen GG displayed on a display section 71-1 provided in the terminal apparatus 70-1, and in which an image advertisement AD-g[1] pertaining to the commercial item GD[1] and an audio advertisement AD-s[1] pertaining to the commercial item GD[1] are incorporated into the game video for delivery MV played in the video player part MP provided in the video delivery screen GG. FIG. 4 illustrates a case in which a banner image BN[2] pertaining to the commercial item GD[2] is arranged in a video delivery screen GG displayed in a display section 71-2 provided in the terminal apparatus 70-2, and in which an image advertisement AD-g[2] pertaining to the commercial item GD[2] is incorporated in the game video for delivery MV played in the video player part MP provided in the video delivery screen GG.

Although the details will be described below, in the present embodiment there is assumed an example case in which the delivery server 30 incorporates the video advertisement AD only into the game video for delivery MV from among delivery videos but not into the music video from among the delivery videos. In the present embodiment, it is also assumed that the commercial item GD indicated by the banner image BN, which the delivery server 30 has included in the video delivery screen GG, is the same as the commercial item GD indicated by the video advertisement AD, which is incorporated into the game video for delivery MV and played in the video player part MP included in the video delivery screen GG.

As described above, according to the present embodiment, when delivering the game video for delivery MV to the terminal apparatus 70-$m$, the delivery server 30 can deliver to the terminal apparatus 70-$m$ a video advertisement AD[$q$] for the commercial item GD[$q$] in addition to the banner image BN[$q$] for the commercial item GD[$q$]. Therefore, according to the present embodiment, even when a viewer, who views using the terminal apparatus 70-$m$ the game video for delivery MV, is focused on viewing the game video for delivery MV, the presence of the video advertisement AD[$q$] can make them interested in the commercial item GD[$q$] indicated by the banner image BN[$q$]. Also, according to the present embodiment, even when a viewer viewing the game video for delivery MV using the terminal apparatus 70-$m$ presses the full screen display button ZG to enlarge the video player part MP, the presence of the video advertisement AD[$q$] can make the viewer interested in the commercial item GD[$q$] indicated by the banner image BN[$q$]. Also, according to the present embodiment, since the delivery server 30 incorporates the video advertisement AD[q] into the game video for delivery MV by changing a part of the game video for delivery MV, it is possible to incorporate the video advertisement AD[q] in a manner that does not hinder the viewing of the baseball game indicated by the game video for delivery MV. Therefore, according to the present embodiment, it is possible to reduce the probability that viewers of the game video for delivery MV may feel uncomfortable due to the advertisement, compared to, for example, a manner in which a pop-up advertisement is overlaid on the game video for delivery MV and displayed.

3. Functions of Video Delivery System

In the following, description will be given of the functions of the game apparatus 10 and the delivery server 30, with reference to FIGS. 5 to 12.

Figure 5:
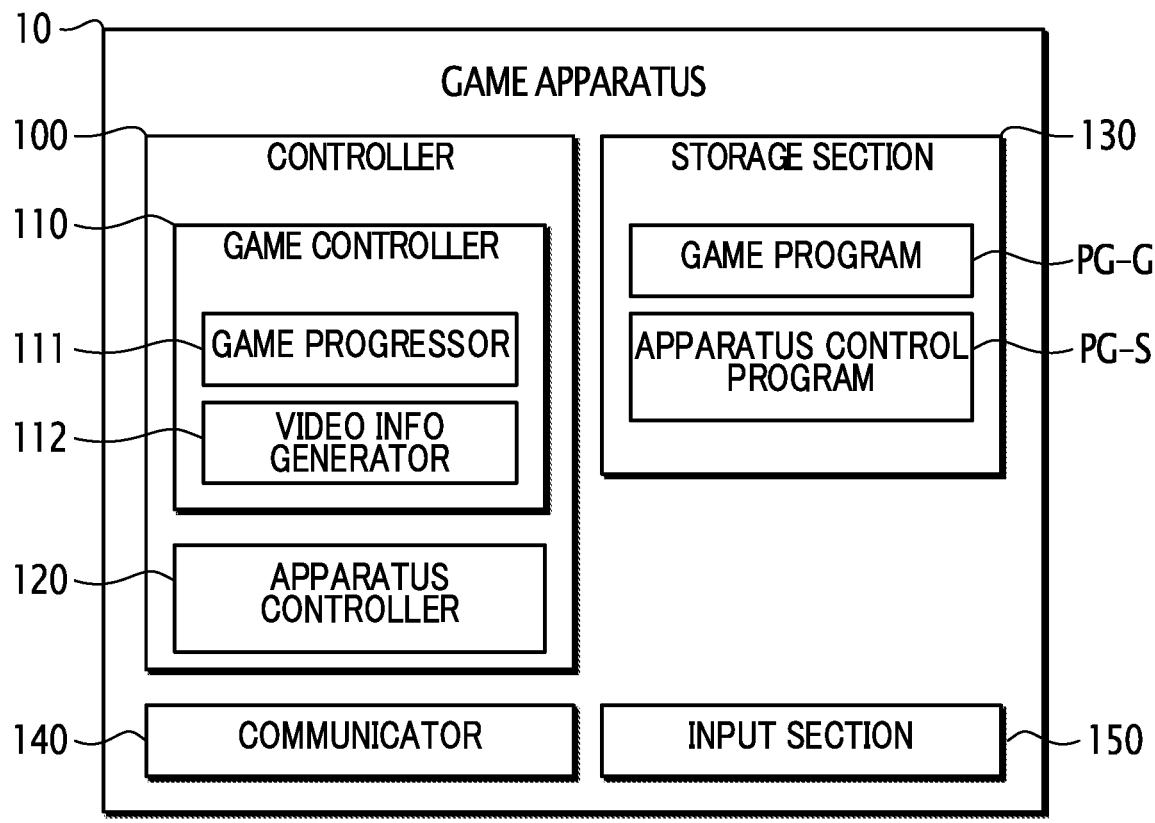
FIG. 5 is a block diagram showing an example configuration of a game apparatus 10.

FIG. 5 is a functional block diagram showing an example configuration of the game apparatus 10.

As shown in FIG. 5, the game apparatus 10 has a controller 100 for controlling each element of the game apparatus 10, a storage section 130 for storing various information, a communicator 140 for carrying out communication with the delivery server 30, and an input section 150 for receiving inputs carried out by a user of the game apparatus 10.

As shown in FIG. 5, the controller 100 includes a game controller 110 and an apparatus controller 120. The game controller 110 includes a game progressor 111 that progresses a baseball game and generates progress status information JG indicating a progression result of the baseball game, and a video information generator 112 that generates, based on the progress status information JG, video information JHM indicating a game video for display HMV. The progress status information JG is information for managing the status of various game elements existing in the virtual space FD and the audio in the virtual space FD, with the states of various game elements present in the virtual space FD changing or with the audio being reproduced in the virtual space FD as the baseball game progresses. Specifically, in the present embodiment, the progress status information JG is, for example, information including some or all of the position, shape, posture or orientation, color, pattern, movement speed, and moving direction of the game elements in the virtual space FD, and the audio existing in the virtual space FD. The game video information for display JHM may be real-time information that indicates in real time a still image for display updated every unit period. The game video information for display JHM may be cumulative information that indicates a plurality of still images for display that correspond one-to-one to a plurality of unit periods (information that indicates a collection of a plurality of still images for display that have been accumulated over a plurality of unit periods). The game video information for display JHM may be information indicating audio in the virtual space FD added to one of the real-time or cumulative information. The still image for display represents the states of various game elements in each unit period and the virtual space FD in each unit period. The apparatus controller 120 generates, based on the game video information for display JHM, the game video information for delivery JMV (an example of "video information") indicative of the game video for delivery MV. The game video information for delivery JMV may be real-time information that indicates, in real time, a still image for delivery updated every unit period. The game video information for delivery JMV may be cumulative information that indicates a plurality of still images for delivery that correspond one-to-one to a plurality of unit periods (information that indicates a collection of a plurality of still images for delivery that have been accumulated over a plurality of unit periods). The game video information for delivery JMV may be information indicating audio in the virtual space FD added to one of the real-time or cumulative information. The still image for delivery may be a still image with a lower resolution than the still image for display, or may be a still image identical to the still image for display.

As shown in FIG. 5, the storage section 130 stores a game program PG-G and an apparatus control program PG-S. The game program PG-G is an application program for the game apparatus 10 to execute a baseball game. The apparatus control program PG-S is an operation system program for the controller 100 to control each element of the game apparatus 10.

Figure 6:
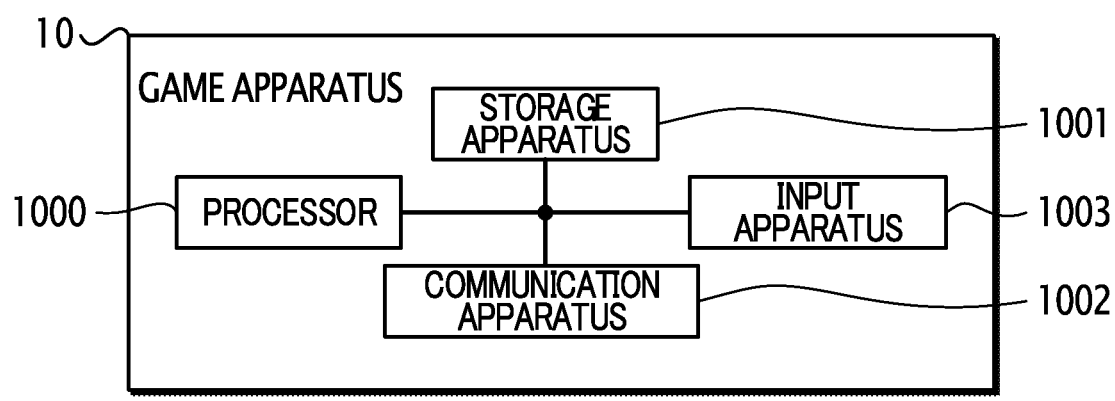
FIG. 6 shows an example hardware configuration of the game apparatus 10.

FIG. 6 is a configuration diagram showing an example hardware configuration of the game apparatus 10.

As shown in FIG. 6, the game apparatus 10 has a processor 1000 that controls each element of the game apparatus 10, a storage apparatus 1001 that stores various information, a communication apparatus 1002 for communicating with an external device present outside the game apparatus 10, and an input apparatus 1003 for receiving operations by a user of the game apparatus 10. The storage apparatus 1001 is a non-transitory recording medium, and includes, for example, one or both of a volatile memory, such as a Random Access Memory (RAM) that serves as a work area of the processor 1000, and a non-volatile memory, such as an Electrically Erasable Programmable Read-Only Memory (EEPROM), that stores various information, such as the game program PG-G and the apparatus control program PG-S. The storage apparatus 1001 functions as the storage section 130. In the present embodiment, the storage apparatus 1001 is given as an example of a "recording medium" in which the game program PG-G is recorded. However, the present invention is not limited thereto. The "recording medium" in which the game program PG-G is recorded may be a storage apparatus provided in an external device present outside the game apparatus 10. For example, the "recording medium" in which the game program PG-G is recorded may be a storage apparatus in which the game program PG-G is recorded, the storage apparatus being provided in a delivery server that is present outside the game apparatus 10 and delivers the game program PG-G. In the present embodiment, an example is given of the storage apparatus 1001 in a form of a "recording medium" in which the apparatus control program PG-S is recorded. However, the present invention is not limited thereto. The "recording medium" in which the apparatus control program PG-S is recorded may be a storage apparatus provided in an external device that is present outside the game apparatus 10. The processor 1000 comprises, for example, one or more Central Processing Units (CPUs). The processor 1000 functions as the game controller 110 by executing the game program PG-G stored in the storage apparatus 1001 and operating in accordance with the game program PG-G. The processor 1000 also functions as the apparatus controller 120 by executing the apparatus control program PG-S stored in the storage apparatus 1001 and operating in accordance with the apparatus control program PG-S. It is to be noted that the processor 1000 may comprise hardware such as a Graphics Processing Unit (GPU), a Digital Signal Processor (DSP), or a Field Programmable Gate Array (FPGA) in addition to, or alternative to, of some or all of the one or more CPUs. In this case, part or all of the game controller 110 and the apparatus controller 120 realized by the processor 1000 may be realized by hardware, such as a DSP. Furthermore, the processor 1000 may comprise some or all of one or more CPUs and one or more hardware elements. For example, when the processor 1000 comprises a plurality of CPUs, some or all of the functions of the game controller 110 may be realized by the plurality of CPUs cooperatively operating in accordance with the control program PRG, and some or all of the functions of the apparatus controller 120 may be realized by the plurality of CPUs operating in cooperation in accordance with the control program PRG. The communication apparatus 1002 is hardware for communicating with an external device that is present outside the game apparatus 10 via one or both of a wired network and a wireless network, and functions as the communicator 140. The input apparatus 1003 is, for example, an input button, and functions as the input section 150 that receives input carried out by a user of the game apparatus 10. The input apparatus 1003 may comprise one or more devices including some or all of an input button, a touch panel, a keyboard, a joystick, and a pointing device (such as a mouse).

Although not shown in the drawings, the delivery apparatus 80 generates music video information indicative of a music video, and transmits the generated music video information to the delivery server 30. In the following, game video information for delivery JMV, which is indicative of a game video for delivery MV, and music video information, which is indicative of a music video, are collectively referred to as delivery video information. Thus, the delivery video information is indicative of a delivery video.

Figure 7:
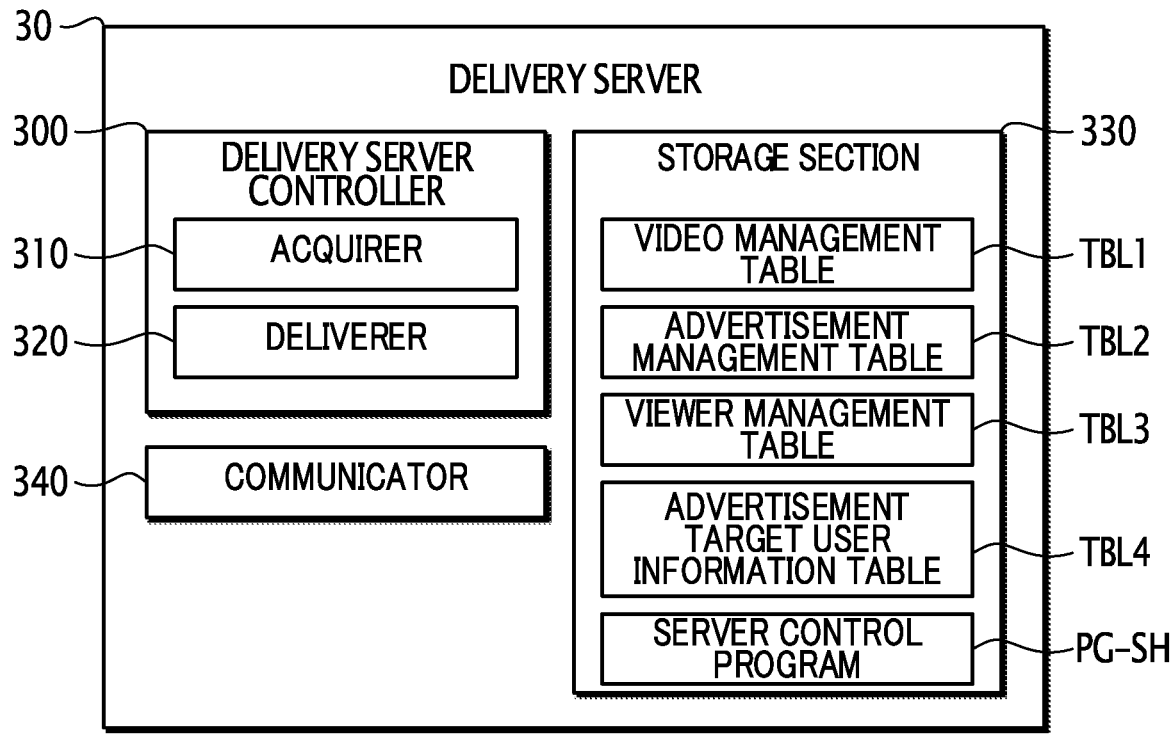
FIG. 7 is a block diagram showing an example configuration of a delivery server 30.

FIG. 7 is a functional block diagram showing an example configuration of the delivery server 30.

As shown in FIG. 7, the delivery server 30 has a controller 300 that controls each element of the delivery server 30, a storage section 330 that stores various information, and a communicator 340 for carrying out communication with the game apparatus 10, the terminal apparatus 70-*m*, and the delivery apparatus 80.

As shown in FIG. 7, the controller 300 comprises an acquirer 310 that acquires delivery video information (game video information for delivery JMV or music video information) from the game apparatus 10 or the delivery apparatus 80, and a deliverer 320 that delivers a delivery video (game video for delivery MV or music video) indicated by the delivery video information to the terminal apparatus 70-*m*. As shown in FIG. 7, the storage section 330 stores a video management table TBL1 (described later), an advertisement management table TBL2 (described later), a viewer management table TBL3 (described later), and an advertisement target user information table TBL4 (described later), and a server control program PG-SH for controlling each element of the delivery server 30 (an example of "program").

Figure 8:
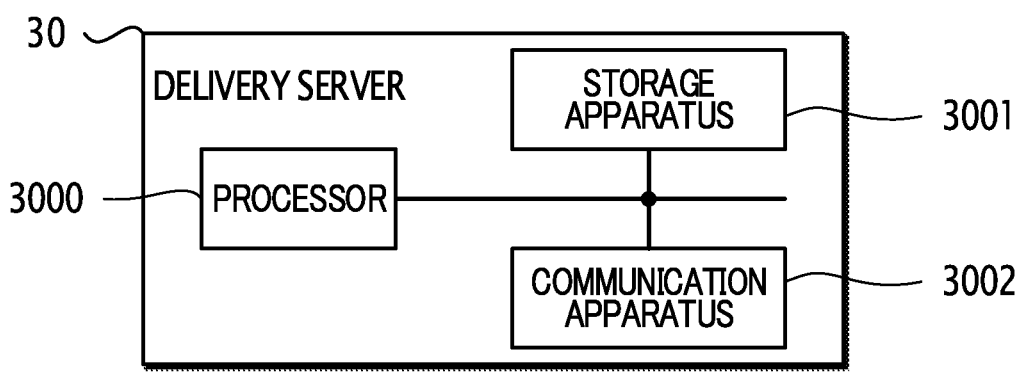
FIG. 8 is a diagram showing an example hardware configuration of the delivery server 30.

FIG. 8 is a configuration diagram showing an example hardware configuration of the delivery server 30.

As shown in FIG. 8, the delivery server 30 is provided with a processor 3000 that controls each element of the delivery server 30, a storage apparatus 3001 that stores various information, and a communication apparatus 3002 for communicating with an external device that is present outside the delivery server 30. The storage apparatus 3001 is a non-transitory recording medium, and includes, for example, one or both of a volatile memory, such as a RAM that serves as a work area of the processor 3000, and a non-volatile memory, such as an EEPROM, that stores various information, such as the server control program PG-SH. The storage apparatus 3001 functions as the storage section 330. In the present embodiment, the storage apparatus 3001 is given as an example of a "recording medium" in which the server control program PG-SH is recorded. However, the present invention is not limited thereto. The "recording medium" in which the server control program PG-SH is recorded may be a storage apparatus provided in an external device present outside the delivery server 30. The processor 3000 comprises, for example, one or more CPUs. The processor 3000 functions as the controller 300 by executing the server control program PG-SH stored in the storage apparatus 3001 and operating in accordance with the server control program PG-SH. The communication apparatus 3002 is hardware for communicating with an external device present outside the delivery server 30, and functions as the communicator 340.

Figure 9:
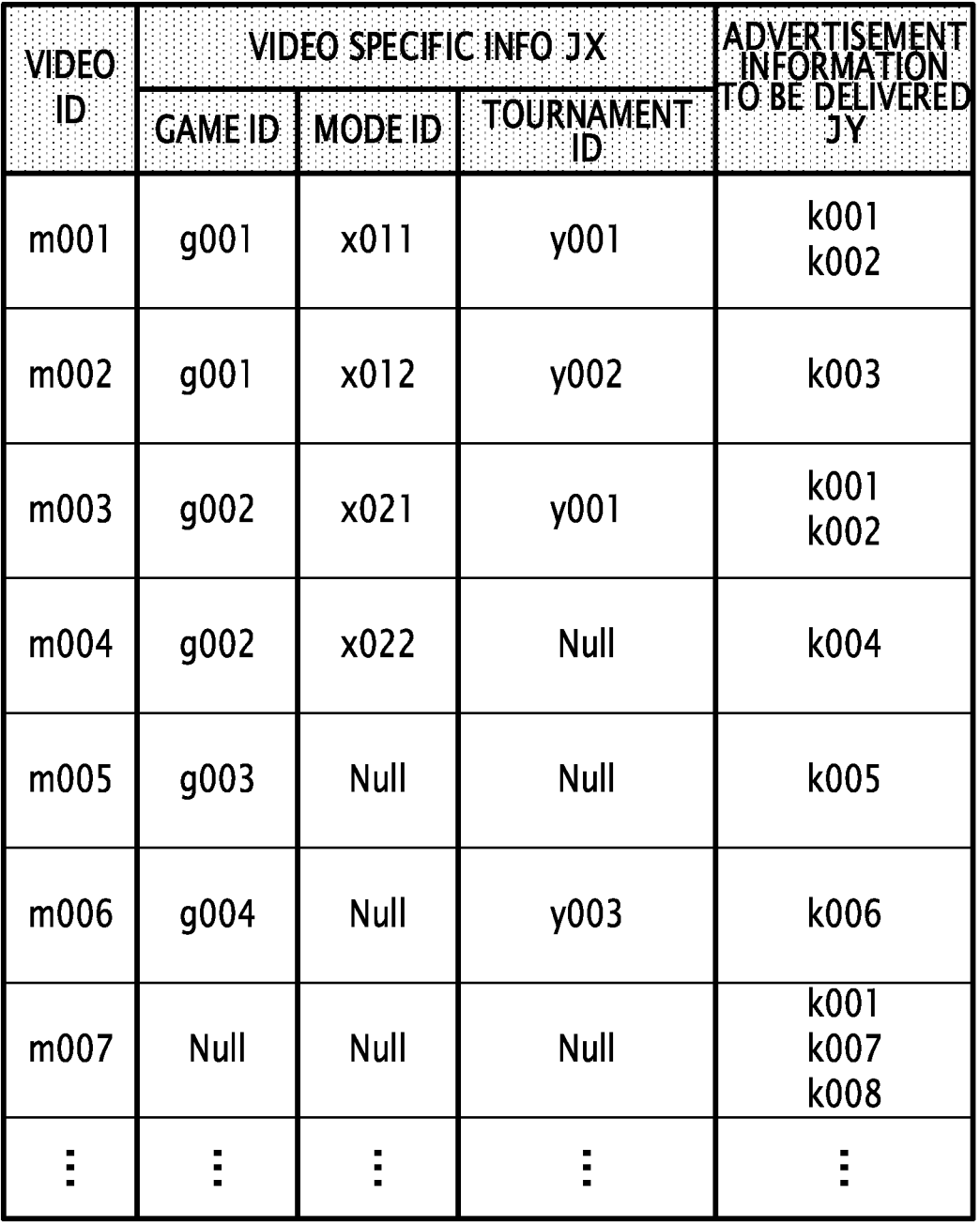
FIG. 9 is a diagram showing an example data configuration of a video management table TBL1.

FIG. 9 is an explanatory diagram showing an example data configuration of the video management table TBL1.

As shown in FIG. 9, the video management table TBL1 has a plurality of records corresponding one-to-one to delivery videos supplied from the game apparatus 10 or the delivery apparatus 80 and to delivery videos scheduled to be supplied from the game apparatus 10 or the delivery apparatus 80. Each record of the video management table TBL1 includes a video ID, video specific information JX, and advertisement information to be delivered JY. The video ID is information for identifying each delivery video from among the delivery videos supplied by the game apparatus 10 or the delivery apparatus 80 and the delivery videos scheduled to be supplied by the game apparatus 10 or the delivery apparatus 80.

The video specific information JX (an example of "specific information") is information for specifying characteristics of a game video for delivery MV. Specifically, in the present embodiment, the video specific information JX is, for example, information that includes some or all of a game ID, a mode ID, and a tournament ID, or information indicating that none of the game ID, the mode ID, nor the tournament ID is included. The information indicating that none of the game ID, the mode ID, nor the tournament ID is included, for example, corresponds to a case in which the game ID, the mode ID, and the tournament ID all indicate "null values." In the present embodiment, "generating specific information" means generating the video specific information JX in which some or all of the game ID, the mode ID, and the tournament ID are different from the "null value."

Here, the game ID (an example of "game identification information") is information for identifying a type of game from among all types of games that can be executed on the game apparatus 10. In the present embodiment, as an example, it is assumed that the game apparatus 10 is capable of executing one or more types of games in addition to a baseball game. In the present embodiment, the game apparatus 10 outputs a game ID corresponding to the type of the game executed in the game apparatus 10. The mode ID (an example of "mode identification information") is information for identifying an operation mode from among all operation modes of the game apparatus 10 in a case in which the game apparatus 10 executes a game. In the present embodiment, as an example, a case is assumed in which the game apparatus 10 executes each of some or all of the games executable in the game apparatus 10, and that each game can be executed in a plurality of operation modes that correspond to respective types of rules. For example, in the present embodiment, there is assumed a case in which the game apparatus 10 is capable of executing a baseball game in two competition modes: a user competition mode in which a user of the game apparatus 10 plays against a user of another game apparatus 10; and a computer competition mode in which the user of the game apparatus 10 plays against a non-player character (NPC). In the present embodiment, the game apparatus 10 outputs a mode ID corresponding to an operation mode of a game executed in the game apparatus 10. The tournament ID is information for identifying a tournament from among game tournaments using games executable in the game apparatus 10. In the present embodiment, in response to the game apparatus 10 executing a game to participate in a game tournament, the game apparatus 10 outputs a tournament ID corresponding to the tournament.

Where the delivery video is a game video for delivery MV, the video specific information JX includes some or all of the game ID, the mode ID, and the tournament ID. When the delivery video is a music video, the game ID, the mode ID, and the tournament ID all indicate "null values."

The advertisement information to be delivered JY is information indicating one or more advertisement IDs corresponding to one or more advertisements that should be delivered together with a delivery video upon the delivery server 30 delivering the delivery video. The advertisement ID is information for identifying an advertisement from among Q advertisements deliverable by the delivery server 30 to the terminal apparatus 70-*m*.

FIG. 10 is an explanatory diagram showing an example data configuration of the advertisement management table TBL2.

As shown in FIG. 10, the advertisement management table TBL2 has Q records corresponding one-to-one to Q types of advertisements deliverable by the delivery server 30 to the terminal apparatuses 70-*m*. Each record of the advertisement management table TBL2 includes an advertisement ID and advertisement delivery information JH. The advertisement delivery information JH is information indicative of the contents of an advertisement pertaining to the commercial item GD[q] and a manner of delivery of the advertisement. Specifically, the advertisement delivery information JH includes, for example, commercial item information JS, banner advertisement delivery information JB, and video advertisement delivery information JD.

The commercial item information JS is information that indicates an overview of a commercial item GD[q]. The commercial item information JS includes, for example, a commercial item ID corresponding to the commercial item GD[q] and the name of the commercial item GD[q]. The commercial item ID is information for identifying the commercial item GD[q] from among the Q commercial items GD[1]-GD[Q].

The banner advertisement delivery information JB is information about a delivery of a banner image BN[q] pertaining to the commercial item GD[q]. The banner advertisement delivery information JB includes, for example, a banner ID, banner file information, and banner link information. Here, the banner ID is information for identifying the banner image BN[q] pertaining to the commercial item GD[q] that corresponds to a commercial item ID from among all the banner images BN that may be delivered by the delivery server 30. The banner file information is information that indicates a still-image file or a video file for displaying the banner image BN[q] corresponding to the banner ID. The banner link information is information indicating an address of a website to be displayed on the display section 71-*m* in response to a selection of the banner image BN[q] displayed on the display section 71-*m*, the selection being carried out by a user of the terminal apparatus 70-*m*. For example, the banner link information indicates the address of a website pertaining to the commercial item GD[q].

The video advertisement delivery information JD is information related to a delivery of a video advertisement AD[q] pertaining to a commercial item GD[q] that corresponds to an advertisement ID. The video advertisement delivery information JD includes, for example, image advertisement delivery information and audio advertisement delivery information.

The image advertisement delivery information is information related to the delivery of an image advertisement AD-g[q] pertaining to the commercial item GD[q] corresponding to the advertisement ID. The image advertisement delivery information includes, for example, an image ID, image file information, and image position information. Here, the image ID is information for identifying the image advertisement AD-g[q] pertaining to the commercial item GD[q] corresponding to the advertisement ID from among all image advertisements AD-g[q] that may be incorporated into the game video for delivery MV. The image file information is information that indicates a still-image file or video file for displaying the image advertisement AD-g[q] corresponding to the advertisement ID. The image position information is information that indicates a position within the game video for delivery MV; the position is where the image advertisement AD-g[q] corresponding to the advertisement ID is displayed.

The audio advertisement delivery information is information about a delivery of an audio advertisement AD-s[q] pertaining to a commercial item GD[q] that corresponds to the advertisement ID. The audio advertisement delivery information includes, for example, an audio ID and audio file information. Here, the audio ID is information for identifying the audio advertisement AD-s[q] pertaining to the commercial item GD[q] corresponding to the advertisement ID from among all audio advertisements AD-s[q] that may be incorporated into the game video for delivery MV. The audio file information is information that indicates an audio file for playing the audio advertisement AD-s[q] corresponding to the advertisement ID.

FIG. 11 is an explanatory diagram showing an example data configuration of the viewer management table TBL3.

As shown in FIG. 11, the viewer management table TBL3 has, for example, a plurality of records corresponding one-to-one to a plurality of viewers who are able to view videos delivered from the delivery server 30. Each record of the viewer management table TBL3 includes, for example, a viewer ID, viewer access information, and viewer information. Here, the viewer ID is information for identifying each viewer from among a plurality of viewers able to view videos delivered from the delivery server 30. The viewer access information may be, for example, information indicating an account used by a viewer to access the delivery server 30, or information indicating an IP address of a terminal apparatus 70 of the viewer. In addition, the viewer information (an example of "attribute information") is information that indicates the attributes of the viewer. In this modification, the viewer information includes, for example, information indicating the age of the viewer, information indicating the gender of the viewer, and information indicating the region in which the viewer resides. The viewer information may also include information indicating a history of Internet browsing by the viewer.

FIG. 12 is an explanatory diagram showing an example data configuration of the advertisement target user information table TBL4.

As shown in FIG. 12, the advertisement target user information table TBL4 has, for example, Q records corresponding one-to-one to Q types of advertisements that may be delivered by the delivery server 30. Each record of the advertisement target user information table TBL4 includes, for example, an advertisement ID and advertisement target user information. Here, the advertisement target user information is information that indicates the attributes of a viewer to whom an advertisement corresponding to the advertisement ID is to be delivered. Specifically, in this modification, the advertisement target user information includes, for example, information indicating the age of viewers to whom of the advertisement corresponding to the advertisement ID should be delivered (advertising target age information), information indicating the gender of viewers to whom the advertisement corresponding to the advertisement ID should be delivered (advertising target gender information), and information indicating a region in which reside viewers to whom the advertisement corresponding to the advertisement ID should be delivered (advertising target region information).

4. Operation of Video Delivery System

In the following, description will be given of an example operation of the video delivery system Sys with reference to FIG. 13.

Figure 13:
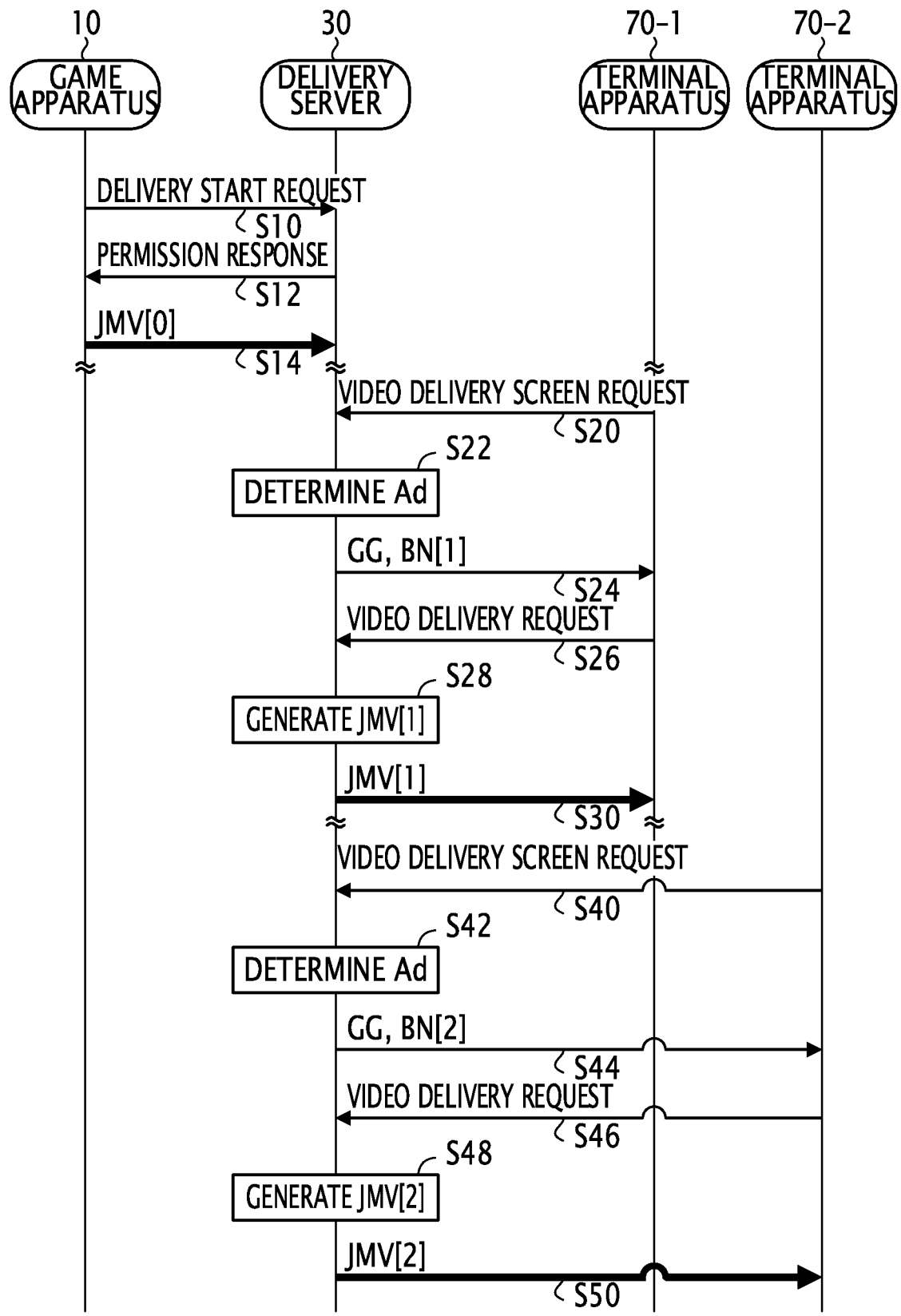
FIG. 13 is a sequence chart showing an example operation of the video delivery system Sys.

FIG. 13 is a sequence chart showing an example operation of the video delivery system Sys, the operation being carried out when, in response a supply of a game video for delivery MV from the game apparatus 10 to the delivery server 30, the delivery server 30 delivers the game video for delivery MV supplied by the game apparatus 10 to the terminal apparatuses 70-1 and 70-2 (hereinafter, "system operation example").

In the system operation example shown in FIG. 13, there is assumed, as an example, that a game video for delivery MV pertaining to a baseball game, a banner image BN[1] pertaining to a commercial item GD[1], and a video advertisement AD[1] are delivered from the delivery server 30 to the terminal apparatus 70-1, and that the game video for delivery MV pertaining to a baseball game, a banner image BN[2] pertaining to a commercial item GD[2], and a video advertisement AD[2] are delivered from the delivery server 30 to the terminal apparatus 70-2. Furthermore, in the system operation example, a game video for delivery MV that does not include a video advertisement AD is referred to as a game video for delivery MV[0]; game video information for delivery JMV that indicates the game video for delivery MV[0] is referred to as game video information for delivery JMV[0]; and a game video for delivery MV that includes a video advertisement AD [1] for the commercial item GD [1] is referred to as a game video for delivery MV[1]. Game video information for delivery JMV indicating the game video for delivery MV[1] is referred to as game video information for delivery JMV[1]; a game video for delivery MV into which the video advertisement AD[2] for the commercial GD[2] is incorporated is referred to as a game video for delivery MV[2]; and game video information for delivery JMV indicating the game video for delivery MV[2] is referred to as game video information for delivery JMV[2]. Furthermore, in the system operation example, for convenience of explanation, a supplemental description will be given, as appropriate, also of an operation of the video delivery system Sys for a case in which the delivery apparatus 80 supplies a music video to the delivery server 30, and the delivery server 30 delivers the music video supplied by the delivery apparatus 80 to the terminal apparatuses 70-1 and 70-2.

As shown in FIG. 13, in the system operation example, the controller 100 of the game apparatus 10 controls the respective parts of the game apparatus 10 so that a delivery start request is transmitted to the delivery server 30 (S10). The delivery start request is information indicating that the game apparatus 10 or the delivery apparatus 80 starts supplying the game video for delivery MV or the music video to the delivery server 30. At Step S10, in transmitting a delivery start request to the delivery server 30, the controller 100 of the game apparatus 10 generates video specific information JX pertaining to a game video for delivery MV that the game apparatus 10 will be supplying to the delivery server 30, and supplies the generated video specific information JX to the delivery server 30. In a case in which the delivery apparatus 80 transmits a delivery start request to the delivery server 30, the delivery apparatus 80 may supply the delivery server 30 with video specific information JX in which the game ID, the mode ID, and the tournament ID all indicate "null values".

Thereafter, the controller 300 of the delivery server 30 controls the respective parts of the delivery server 30 so that, when the delivery start request is supplied from the game apparatus 10, a response (permission response) to the delivery start request is transmitted to the game apparatus 10 (S12). The controller 300 of the delivery server 30 controls the respective parts of the delivery server 30 so that, when the delivery start request is supplied from the delivery apparatus 80, a permission response is transmitted to the delivery apparatus 80. In addition, the controller 300 of the delivery server 30 creates a new record in the video management table TBL1 at Step S12. Then, at Step S12, the controller 300 of the delivery server 30 assigns a new video ID, to notify the video ID to the game apparatus 10 or to the delivery apparatus 80 that transmitted the delivery start request at Step S10. Furthermore, at Step S12, the controller 300 of the delivery server 30 stores the newly assigned video ID in the newly created record. In the system operation example, the video ID of the delivery video may be, for example, a Uniform Resource Locator (URL) of the video delivery screen GG in which the video player part MP for playing the delivery video is provided, or a character string (e.g., a directory name, or a character string indicating a path name) included in the URL. In addition, in response to a supply of the video specific information JX from the game apparatus 10 at Step S10, the controller 300 of the delivery server 30 stores, at Step S12, the video specific information JX in the newly created record.

Thereafter, the controller 100 of the game apparatus 10 controls the respective parts of the game apparatus 10 so that the game video information for delivery JMV[0] indicative of the game video for delivery MV[0] is transmitted to the delivery server 30 (S14). Also, at Step S14, the controller 100 of the game apparatus 10 transmits to the delivery server 30 the video ID together with the game video information for delivery JMV[0], the video ID having been notified at Step S12 from the delivery server 30. In a case in which the controller 300 of the delivery server 30 transmits a permission response to the delivery apparatus 80 at Step S12, the delivery apparatus 80 transmits the music video to the delivery server 30. In this case, the delivery apparatus 80 transmits to the delivery server 30 together with the music video the video ID notified by the delivery server 30 at Step S12.

As shown in FIG. 13, in the system operation example, there is assumed a case in which the terminal apparatus 70-1 transmits a video delivery screen request to the delivery server 30 in a period after the processing of Step S14 is carried out (S20). The video delivery screen request is information requesting transmission of a video delivery screen GG that displays delivery videos. In the system operation example, it is assumed that the video delivery screen request is a request to transmit the video delivery screen GG that displays the game video for delivery MV. In the present embodiment, it is assumed that the delivery server 30 provides a webpage on which there are displayed a plurality of thumbnails corresponding to a plurality of delivery videos that can be delivered from the delivery server 30. A case is further assumed in which, in response to a selection of a thumbnail that corresponds to a delivery video that a viewer intends to view with the terminal apparatus 70-1, with the selection being carried out by the viewer on the webpage displaying the plurality of thumbnails, the terminal apparatus 70-1 transmits a video ID of the delivery video corresponding to the selected thumbnail to the delivery server 30 at Step S20. In the present embodiment, it is assumed that the terminal apparatus 70-1 transmits to the delivery server 30 viewer access information of the viewer viewing a video on the terminal apparatus 70-1 at Step S20.

Then, the controller 300 of the delivery server 30 determines an advertisement to be delivered to the terminal apparatus 70-1 based on the video ID and the viewer access information transmitted from the terminal apparatus 70-1 (S22). Specifically, at Step S22, the controller 300 of the delivery server 30 first identifies, from among a plurality of records in the viewer management table TBL3, a record in which the viewer access information acquired from the terminal apparatus 70-1 is recorded. Next, the controller 300 of the delivery server 30 identifies, from among a plurality of records in the advertisement target user information table TBL4, one or more records in each of which there is recorded advertisement target user information that includes the age, gender, and region indicated by the viewer information in the record identified in the viewer management table TBL3. Then, by referring to the video management table TBL1, the controller 300 of the delivery server 30 identifies an advertisement ID included in the advertisement information to be delivered JY corresponding to the video ID transmitted at Step S20, from among one or more advertisement IDs recorded in the one or more records identified in the advertisement target user information table TBL4. The controller 300 then decides an advertisement of the identified advertisement ID to be an advertisement to be delivered to the terminal apparatus 70-1. In the system operation example, it is assumed as an example that the controller 300 of the delivery server 30 determines an advertisement pertaining to the commercial item GD[1] as an advertisement to be delivered to the terminal apparatus 70-1.

Next, the controller 300 of the delivery server 30 controls the respective parts of the delivery server 30 so that the video delivery screen GG is delivered to the terminal apparatus 70-1 (S24). Also, at Step S24, the controller 300 of the delivery server 30 controls the respective parts of the delivery server 30 so that the banner image BN (banner image BN[1]) pertaining to the advertisement determined at Step S22 is delivered to the terminal apparatus 70-1.

Thereafter, the terminal apparatus 70-1 transmits a video delivery request of the delivery video to the delivery server 30 in response to the play start button ST being pressed in the video delivery screen GG displayed on the display section 71-1 of the terminal apparatus 70-1 (S26). In the system operation example, the terminal apparatus 70-1 transmits a video delivery request of the game video for delivery MV to the delivery server 30 at Step S26. In the present embodiment, it is assumed that the terminal apparatus 70-1 transmits to the delivery server 30, at Step S26, a video ID of a delivery video to be viewed on the terminal apparatus 70-1 and the viewer access information of the viewer viewing the video on the terminal apparatus 70-1.

In a case in which the video ID transmitted at Step S26 indicates the game video for delivery MV, the controller 300 of the delivery server 30, upon acquisition of the video delivery request transmitted from the terminal apparatus 70-1, generates delivery video information indicating the game video for delivery MV (game video information for delivery JMV[1]) by incorporating the video advertisement AD[1] into the game video for delivery MV[0] indicated by the game video information for delivery JMV[0] (S28).

Next, the controller 300 of the delivery server 30 controls the respective parts of the delivery server 30 so that the delivery video information is transmitted to the terminal apparatus 70-1 (S30). In the system operation example, the controller 300 of the delivery server 30 controls the respective parts of the delivery server 30 so that the game video information for delivery JMV[1] is transmitted to the terminal apparatus 70-1 at Step S30. In a case in which the video ID acquired at Step S26 indicates a music video, the controller 300 of the delivery server 30 controls the respective parts of the delivery server 30 so that the music video in which no video advertisement AD[q] is incorporated is transmitted to the terminal apparatus 70-1 at Step S30. In the system operation example, upon receipt at the terminal apparatus 70-1 of the game video information for delivery JMV[1] transmitted from the delivery server 30 at Step S30, the video delivery screen GG as shown in FIG. 3, for example, is displayed on the display section 71-1 of the terminal apparatus 70-1.

As shown in FIG. 13, in the system operation example, there is assumed a case in which the terminal apparatus 70-2 transmits a video delivery screen request to the delivery server 30 in a period after the processing of Step S14 is carried out (S40). At Step S40, the terminal apparatus 70-2 transmits to the delivery server 30 a video ID of a delivery video that is to be viewed on the terminal apparatus 70-2 and viewer access information of a viewer who will be viewing the video on the terminal apparatus 70-2.

Then, the controller 300 of the delivery server 30 determines an advertisement to be delivered to the terminal apparatus 70-2 based on the video ID and the viewer access information transmitted from the terminal apparatus 70-2 (S42). In the system operation example, it is assumed as an example that the controller 300 of the delivery server 30 determines an advertisement pertaining to the commercial item GD[2] as an advertisement to be delivered to the terminal apparatus 70-2.

Next, the controller 300 of the delivery server 30 controls the respective parts of the delivery server 30 so that the video delivery screen GG is delivered to the terminal apparatus 70-2 (S44). Also, at Step S44, the controller 300 of the delivery server 30 controls the respective parts of the delivery server 30 so that the banner image BN (banner image BN[2]) pertaining to the advertisement determined at Step S42 is delivered to the terminal apparatus 70-2.

Thereafter, the terminal apparatus 70-2 transmits a video delivery request of the delivery video to the delivery server 30 in response to the play start button ST being pressed on the video delivery screen GG displayed on the display section 71-2 of the terminal apparatus 70-2 (S46). In the system operation example, at Step S46, the terminal apparatus 70-2 transmits to the delivery server 30 a video delivery request of the game video for delivery MV. In the present embodiment, it is assumed that the terminal apparatus 70-2 transmits, at Step S46, a video ID of a delivery video to be viewed on the terminal apparatus 70-2 and the viewer access information of the viewer viewing the video on the terminal apparatus 70-2 to the delivery server 30.

In a case in which the video ID transmitted at Step S46 indicates a game video for delivery MV, the controller 300 of the delivery server 30, upon acquisition of the video delivery request transmitted from the terminal apparatus 70-2, generates game video information for delivery JMV[2] indicative of the game video for delivery MV[2] by incorporating the video advertisement AD[2] into the game video for delivery MV[0] indicated by the game video information for delivery JMV[0] (S48).

Next, the controller 300 of the delivery server 30 controls the respective parts of the delivery server 30 so that the delivery video is transmitted to the terminal apparatus 70-2 (S50). In the system operation example, the controller 300 of the delivery server 30 controls the respective parts of the delivery server 30 so that the game video information for delivery JMV[2] is transmitted to the terminal apparatus 70-2 at Step S50. In a case in which the video ID acquired at Step S46 indicates a music video, the controller 300 of the delivery server 30 controls the respective parts of the delivery server 30 so that the music video, into which no video advertisement AD[q] is incorporated, is transmitted to the terminal apparatus 70-2 at Step S50. In the system operation example, in response to a receipt at the terminal apparatus 70-2 of the game video information for delivery JMV[2] transmitted from the delivery server 30 at Step S50, the video delivery screen GG shown in FIG. 4, for example, is displayed on the display section 71-2 of the terminal apparatus 70-2.

5. Operation of Delivery Server

In the following, description will be given of operation of the delivery server 30 with reference to FIGS. 14 and 15.

Figure 14:
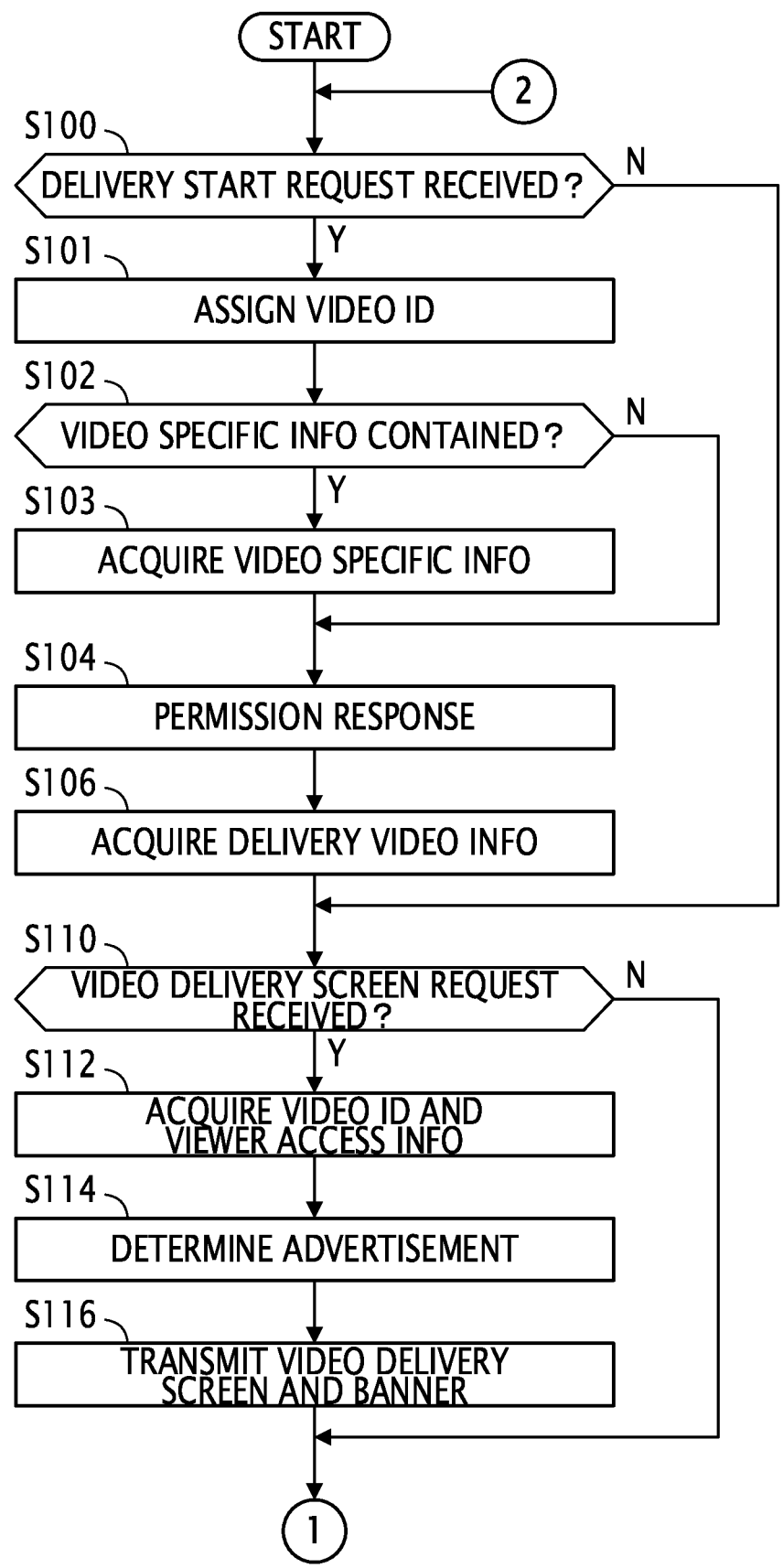
FIG. 14 is a flowchart showing an example operation of the delivery server 30.
Figure 15:
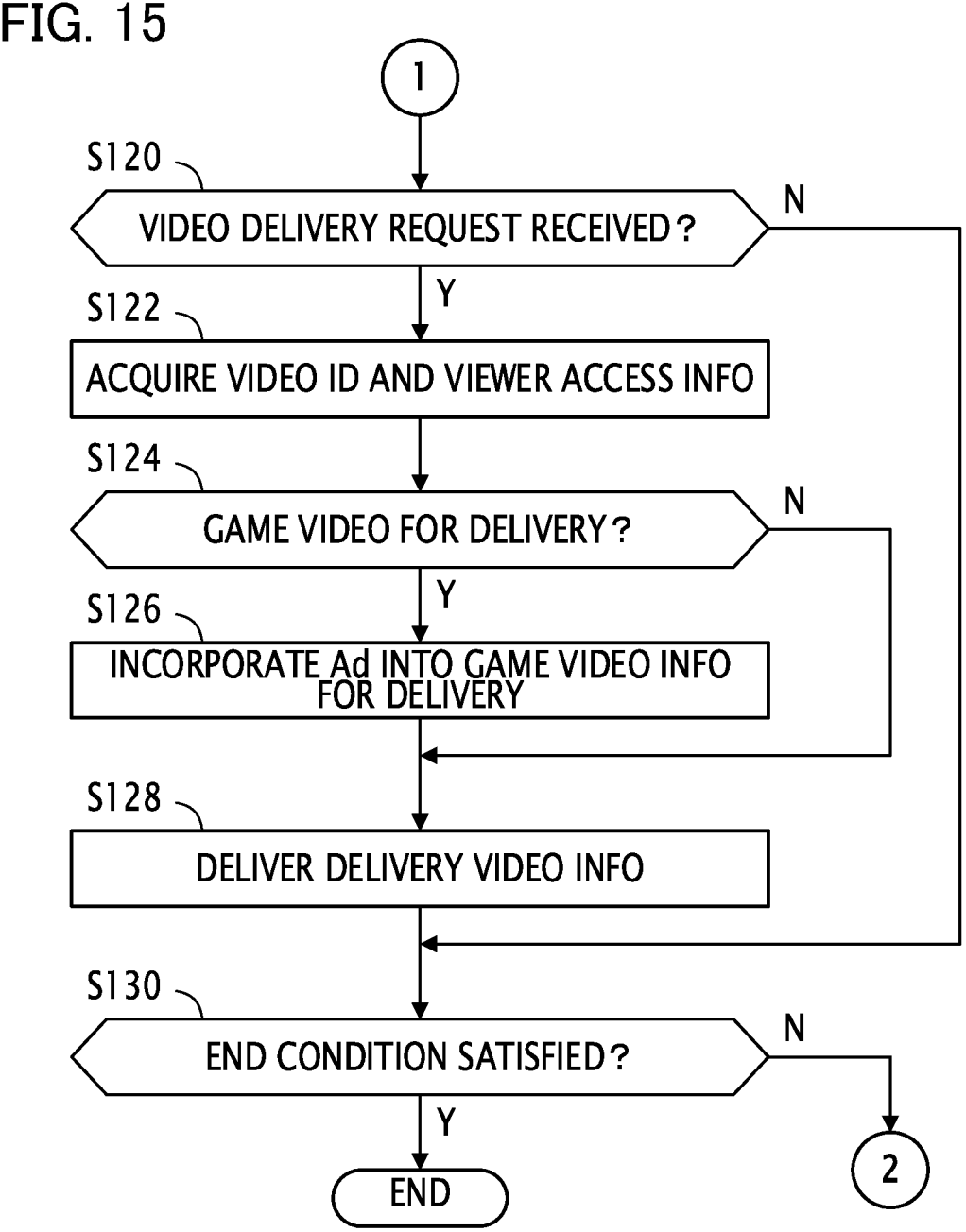
FIG. 15 is a flowchart showing an example of the operation of the delivery server 30.

FIGS. 14 and 15 are flowcharts showing an example operation of the delivery server 30 (hereinafter, "delivery server operation example"). A case is assumed in which the game apparatus 10 or the delivery apparatus 80 supplies a delivery video to the delivery server 30, and the delivery server 30 delivers the delivery video supplied by the game apparatus 10 or the delivery apparatus 80 to the terminal apparatus 70-m.

As shown in FIG. 14, the acquirer 310 determines whether the delivery server 30 has received a delivery start request supplied from the game apparatus 10 or the delivery apparatus 80 (S100). The processing of Step S100 corresponds to the processing of Step S10 shown in FIG. 13. If a result of the determination at Step S100 is negative, the acquirer 310 advances the process to Step S110.

If a result of the determination at Step S100 is affirmative, the acquirer 310 creates a new record in the video management table TBL1 and stores the newly assigned video ID in the new record (S101). In addition, the acquirer 310 determines whether the video specific information JX indicating a value different from the null value is supplied at Step S100 together with the delivery start request (S102). If a result of the determination at Step S102 is negative, the acquirer 310 advances the process to Step S104. If a result of the determination at Step S102 is affirmative, the acquirer 310 stores at Step S103 the video specific information JX supplied at Step S100 in association with the video ID assigned at Step S101 in the record created at Step S101. In the present embodiment, "acquiring the video specific information JX" corresponds to "storing the video specific information JX indicating a value different from the null value in the video management table TBL1." Thus, in the present embodiment, it is understood that, when "the video specific information JX indicating a null value" is supplied at Step S100, the acquirer 310 does not acquire the video specific information JX.

Next, the acquirer 310 transmits a permission response to the game apparatus 10 or the delivery apparatus 80 (S104). In addition, at Step S104, the acquirer 310 transmits the video ID that was assigned at Step S101 to the game apparatus 10 or to the delivery apparatus 80 together with the permission response. The processing of Steps S101 to S104 corresponds to the processing of Step S12 shown in FIG. 13. Thereafter, the acquirer 310 acquires delivery video information supplied from the game apparatus 10 or the delivery apparatus 80 (S106). The processing of Step S106 corresponds to the processing of Step S14 shown in FIG. 13.

As shown in FIG. 14, the acquirer 310 determines whether the delivery server 30 has received a video delivery screen request transmitted from the terminal apparatus 70-m (S110). The processing of Step S110 corresponds to the processing of Step S20 or S40 shown in FIG. 13. If a result of the determination at Step S110 is negative, the acquirer 310 advances the process to Step S120.

If a result of the determination at Step S110 is affirmative, the acquirer 310 acquires the video ID and viewer access information supplied from the terminal apparatus 70-m together with the video delivery screen request (S112).

Then, the deliverer 320 determines an advertisement to be delivered to the terminal apparatus 70-m based on the video ID and the viewer access information acquired at Step S112 (S114). As described above, the deliverer 320 identifies, from among a plurality of records included in the video management table TBL1, a record in which the video ID acquired at Step S112 is recorded. The deliverer 320 determines an advertisement for an advertisement ID contained in the advertisement information to be delivered JY stored in the identified record, to be an advertisement to be delivered to the terminal apparatuses 70-m. In other words, with a delivery video that corresponds to the video ID acquired at Step S112 being a game video for delivery MV, and with video specific information JX that corresponds to the video ID including some or all of the game ID, the mode ID, and the tournament ID, the deliverer 320 determines an advertisement pertaining to the commercial item GD[q] that is related to some or all of the game ID, the mode ID, and the tournament ID, to be the advertisement to be delivered to the terminal apparatus 70-m.

In the present embodiment, when video specific information JX that corresponds to a video ID acquired at Step S112 includes some or all of a game ID, a mode ID, and a tournament ID, the delivery video corresponding to the video ID is an example of a "specific video." Also, in the present embodiment, when the video specific information JX corresponding to the video ID acquired at Step S112 includes some or all of a game ID, a mode ID, and a tournament ID, a commercial item GD[q] related to the some or all of the game ID, the mode ID, and the tournament ID is an example of a "specific commercial item." Also in the present embodiment, when the video specific information JX corresponding to the video ID acquired at Step S112 includes some or all of a game ID, a mode ID, and a tournament ID, an advertisement determined at Step S114 is an example of a "specific advertisement." Also, in the present embodiment, a commercial item GD[q] with an advertisement ID indicated by advertisement information to be delivered JY that corresponds to the video ID acquired at Step S112 is an example of a "candidate commercial item." The processing of Step S114 corresponds to the processing of Step S22 or S42 shown in FIG. 13.

Next, the deliverer 320 controls the respective parts of the delivery server 30 so that the video delivery screen GG for displaying the delivery video corresponding to the video ID acquired at Step S112 and the banner image BN[q] corresponding to the advertisement determined at Step S114 are delivered to the terminal apparatus 70-m (S116). The processing of Step S116 corresponds to the processing of Step S24 or S44 shown in FIG. 13.

As shown in FIG. 15, the acquirer 310 determines whether the delivery server 30 has received a video delivery request transmitted from the terminal apparatus 70-m (S120). The processing of Step S120 corresponds to the processing of Step S26 or S46 shown in FIG. 13. If a result of the determination at Step S120 is negative, the acquirer 310 advances the process to Step S130.

If a result of the determination at Step S120 is affirmative, the acquirer 310 acquires a video ID and viewer access information supplied with the video delivery request from the terminal apparatus 70-m (S122). Then, the deliverer 320 determines whether a delivery video that corresponds to the video ID acquired at Step S122 is a game video for delivery MV (S124). Specifically, at Step S124, the deliverer 320 determines whether the video specific information JX corresponding to the video ID acquired at Step S122 includes at least one of a game ID, a mode ID, and a tournament ID. If a result of the determination at Step S124 is negative, the deliverer 320 advances the process to Step S128.

If a result of the determination at Step S124 is affirmative, the deliverer 320 incorporates the video advertisement AD[q] corresponding to the advertisement determined at Step S114 into the delivery video (game video for delivery MV) corresponding to the video ID acquired at Step S122 (S126). The processing of Step S126 corresponds to the processing of Step S28 or S48 shown in FIG. 13.

Then, the deliverer 320 delivers (S128) to the terminal apparatus 70-m the delivery video information indicating the delivery video corresponding to the video ID acquired at Step S122.

Thereafter, the deliverer 320 determines whether a predetermined end condition is satisfied (S130). The predetermined end condition is, for example, a condition indicating that the delivery of a delivery video from the delivery server 30 to the terminal apparatus 70-m is to be stopped. If a result of the determination at Step S130 is negative, the deliverer 320 advances the process to Step S100. If a result of the determination at Step S130 is affirmative, the deliverer 320 terminates the process shown in FIGS. 14 and 15.

Summary of Embodiment

As described above, in the present embodiment, the deliverer 320 acquires video specific information JX indicating that a game video for delivery MV is a delivery video associated with a specific advertisement from the game apparatus 10. Therefore, in the present embodiment, the deliverer 320 is able to identify a game video for delivery MV that is associated with a specific advertisement, from among a plurality of delivery videos deliverable by the deliverer 320. This makes it possible, in the present embodiment, for the deliverer 320 to block deliveries, to the terminal apparatus 70-m, of advertisements unrelated to the game video for delivery MV.

Also, in the present embodiment, the deliverer 320 incorporates the video advertisement AD[q] into the game video for delivery MV. Viewers of the game video for delivery MV of the baseball game are interested in the progress of the baseball game. According to the present embodiment, such viewers can be made aware of the presence of the banner image BN[q], and can be made interested in the commercial item GD[q] indicated by the banner image BN[q].

B. Modifications

Each of the above embodiments may be modified in various forms. Examples of specific modes of modifications will be given in the following. Two or more forms freely selected from the following examples may be combined as long as they do not conflict with one another. For elements for which actions and functions are equivalent to those of the embodiments in the modifications illustrated below, the reference signs referred to in the above description are used, and the detailed description thereof is omitted as appropriate.

Modification 1

In the above-described embodiment, the video ID is information for identifying each delivery video from among the delivery videos supplied by the game apparatus 10 or the delivery apparatus 80 and the delivery videos scheduled to be supplied by the game apparatus 10 or the delivery apparatus 80, but the present invention is not limited thereto. The video ID may be, for example, information for identifying each of the game videos for delivery MV from among the game videos for delivery MV supplied by the game apparatus 10 and the game videos for delivery MV scheduled to be supplied by the game apparatus 10. The video ID may also be information for identifying each game video for delivery MV from among all game videos MV for delivery to be supplied from the game apparatus 10 in the past or in the future. In such cases, the delivery server 30 may control, in the video management table TBL1, information for identifying a music video, separately from the video ID, from among the music videos supplied from the delivery apparatus 80 and the music videos scheduled to be supplied from the delivery apparatus 80.

When the video ID is information for identifying a game video for delivery MV from among all game videos MV for delivery that will be supplied from the game apparatus 10 in the past or in the future, the delivery server 30 may, in advance, notify the game apparatus 10 of the game video for delivery MV and the corresponding video ID before the delivery start request is supplied from the game apparatus 10. In this case, the game apparatus 10 may notify the delivery server 30 of the video ID together with the delivery start request. In this case, the delivery server 30 may determine that the delivery video corresponding to the delivery start request is a game video for delivery MV in response to a notification of the video ID received with the delivery start request.

Modification 2

In the above-described embodiments and Modification 1, the video delivery system Sys may comprise: a plurality of game apparatuses 10 communicable with the delivery server 30; and a game server (not shown) that manages game tournament information pertaining to the holding of a game tournament for a baseball game and communicable with the plurality of game apparatuses 10, in addition to the delivery server 30 and the plurality of terminal apparatuses 70-1 to 70-M. Here, the game tournament information is information that manages, in association with one another, a tournament ID, device identification information that identifies, from among a plurality of game apparatuses 10, a game apparatus 10 in which a baseball game for a game tournament that corresponds to the tournament ID is carried out, and period information that indicates a period during which the game tournament corresponding to the tournament ID is held. In this modification, the tournament ID is information for identifying a game tournament from among a plurality of game tournaments pertaining to the baseball game. In this modification, each game apparatus 10 supplies the tournament ID to the delivery server 30 only when it executes a baseball game for the game tournament corresponding to the tournament ID during the period of the game tournament corresponding to the tournament ID.

In the following, description will be given of an overview of an operation of the video delivery system Sys in this modification, the operation described being up to the point at which the game apparatus 10 supplies the tournament ID to the delivery server 30.

In this modification, the game server first refers to the game tournament information and transmits, prior to the start of a period of a game tournament for a baseball game, an event notification to a plurality of game apparatuses 10, the event notification indicating that the game tournament will be held. The plurality of game apparatuses 10 then receive the event notification transmitted from the game server. Thereafter, in response to transmission, from a game apparatus 10 to the game server, of application information to participate in the game tournament based on an input operation carried out by a user of the game apparatus 10, the game server updates the game tournament information so that the tournament ID corresponding to the game tournament, the device identification information corresponding to the game apparatus 10, and the period information indicating the period of the game tournament are associated. When the game apparatus 10 is to execute the baseball game for the game tournament upon the arrival of the period of the game tournament, the game apparatus 10 transmits an execution notification to the game server to the effect that the baseball game for the game tournament is to be executed. Thereafter, upon receiving the execution notification from the game apparatus 10 to the effect that the baseball game for the game tournament is to be executed, the game server notifies the game apparatus 10 of the tournament ID corresponding to the game tournament. The game apparatus 10 then receives the tournament ID corresponding to the game tournament from the game server. Thereafter, when the game apparatus 10 executes a baseball game for the game tournament and transmits, to the delivery server 30, a delivery start request indicating that the game video for delivery MV pertaining to the baseball game is to be supplied, the game apparatus 10 notifies the delivery server 30 of the tournament ID of the game tournament.

Thus, according to this modification, the delivery server 30 is able to deliver advertisements pertaining to the commercial item GD[q] related to the tournament ID of the game tournament to the terminal apparatuses 70-*m* only during the period of the game tournament.

Modification 3

In the above-described embodiments and Modifications 1 and 2, the video management table TBL1 and the advertisement management table TBL2 are stored in the storage section 330 provided in the delivery server 30, but the present invention is not limited thereto. For example, one or both of the video management table TBL1 and the advertisement management table TBL2 may be provided in an external device separate from the delivery server 30.

Figure 16:
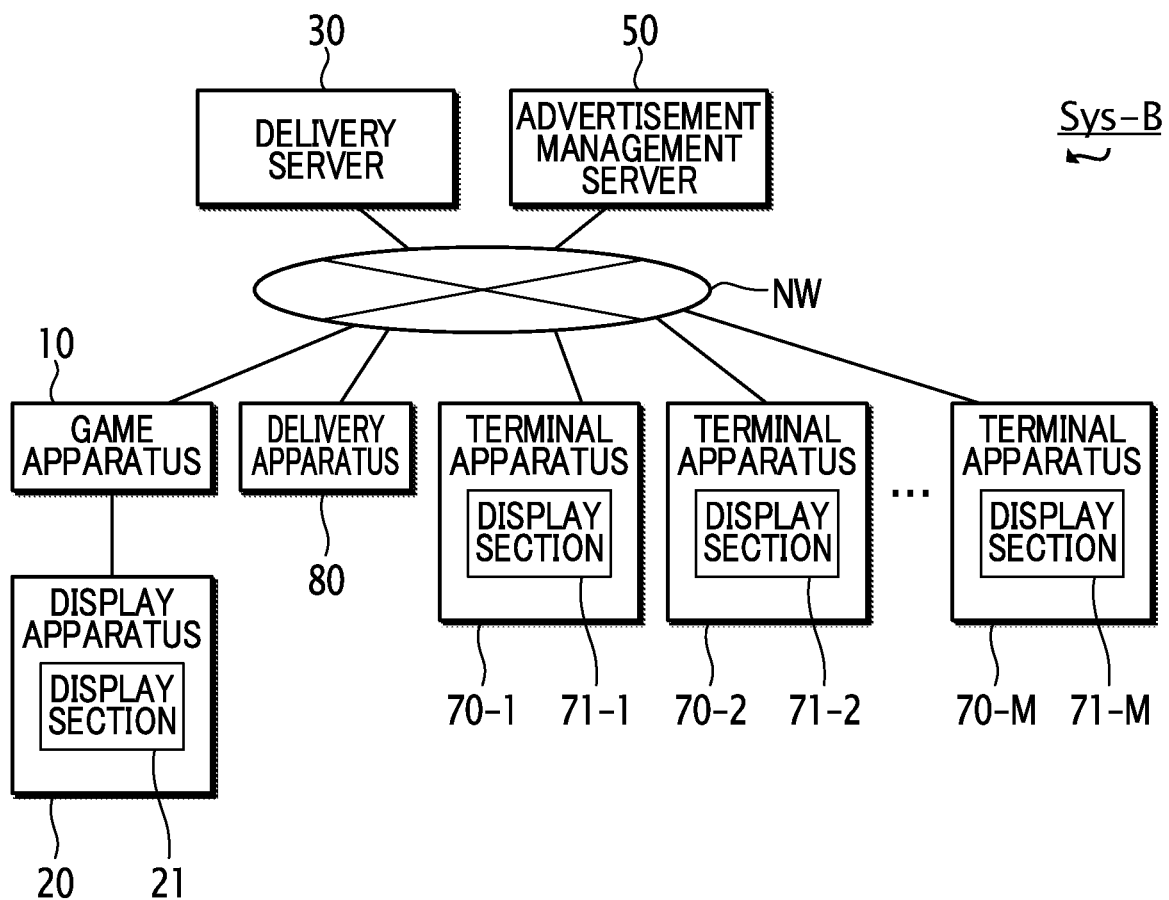
FIG. 16 is an explanatory diagram of an overview of the video delivery system Sys-B for Modification 3.

FIG. 16 is an explanatory diagram for explaining an example configuration of a video delivery system Sys-B for the present modification.

As shown in FIG. 16, the video delivery system Sys-B differs from the video delivery system Sys of the embodiment in that the video delivery system Sys-B has an advertisement management server 50 communicable with the delivery server 30. In this modification, the advertisement management server 50 stores the video management table TBL1 and the advertisement management table TBL2. Also, in this modification, the delivery server 30 does not store the video management table TBL1 or the advertisement management table TBL2. In the present modification, the delivery server 30 carries out various processes described in FIGS. 13 to 15 while referring to the video management table TBL1 and the advertisement management table TBL2 stored in the advertisement management server 50.

Modification 4

In the above-described embodiments and Modifications 1 to 3, the delivery server 30 is able to deliver a banner image BN[q] and a video advertisement AD[q] to the terminal apparatus 70-*m* as an advertisement pertaining to the commercial item GD[q], but the present invention is not limited thereto. The delivery server 30 may be able to deliver one of the banner image BN[q] and the video advertisement AD[q] to the terminal apparatus 70-*m* as an advertisement pertaining to the commercial item GD[q]. Specifically, the delivery server 30 may be able to deliver the banner image BN[q] to the terminal apparatus 70-*m* as an advertisement pertaining to the commercial item GD[q], and may not have a function for incorporating the video advertisement AD[q] into the delivery video.

Modification 5

In the above-described embodiments and Modifications 1 to 4, the delivery server 30 delivers to the terminal apparatus 70-*m* an advertisement pertaining to a commercial item GD[q] selected from Q commercial items GD[1] to GD[Q]. However, the present invention is not limited thereto. The delivery server 30 may deliver one or more advertisements pertaining to one or more predetermined commercial items GD to the terminal apparatus 70-*m*.

Modification 6

In the above-described embodiments and Modifications 1 to 5, a "baseball game" has been illustrated as an example of a "game." Any game may be employed as a "game" in the present invention.

C. Appendices

From the above description, the present invention can be understood, for example, as follows. For the purpose of facilitating the understanding of each aspect, reference signs in the drawings are hereinafter added in brackets for convenience, but this is not intended to limit the present invention to the form shown in the drawings.

APPENDIX 1

A recording medium in accordance with one aspect of the present invention is a recording medium (e.g., storage apparatus 3001) in which a program (e.g., server control program PG-SH) is recorded, the program causing a processor (e.g., processor 3000) of a server apparatus (e.g., delivery server 30) that delivers a video to a terminal apparatus (e.g., terminal apparatus 70-*m*) and is communicable with a game apparatus (e.g., game apparatus 10) capable of executing a game (e.g., a baseball game), to function as: an acquirer (e.g., acquirer 310) configured to acquire, from the game apparatus, video information (e.g., game video information for delivery JMV) indicating a game video of the game (e.g., game video for delivery MV); and a deliverer (e.g., deliverer 320) configured to deliver, to the terminal apparatus, the game video indicated by the video information, and with the game apparatus having generated specific information (e.g., the video specific information JX) indicating that the game video is a specific video, the deliverer is configured to deliver to the terminal apparatus a specific advertisement for a specific commercial item associated with the specific video in response to the acquirer acquiring the video information and the specific information from the game apparatus.

In this aspect, the deliverer acquires, from the game apparatus, specific information indicating that the game video is a specific video associated with a specific advertisement. Accordingly, in this aspect, the deliverer is able to identify a game video associated with a specific advertisement from among the plurality of videos deliverable by the deliverer. This makes it possible, in this aspect, for the deliverer to limit the delivery of advertisements not related to a game video to the terminal apparatus.

In the above aspect, the "game video" may be, for example, a set of a plurality of game images that correspond one-to-one to a plurality of unit periods (e.g., a period of 1/60 of a second). In this case, for example, the deliverer may deliver the game images corresponding to each unit period to the terminal apparatus prior to the start of the unit period so that the terminal apparatus can display the game images corresponding to the unit period in each unit period. In this case, for example, the deliverer may deliver a game image corresponding to each unit period to the terminal apparatus for each unit period, to cause the terminal apparatus to display the game image on the terminal apparatus at a timing corresponding to the timing at which the terminal apparatus receives the game image. In the above manner, the "game video" may include, for example, audio related to the game.

In the above aspect, a "specific video" may be, for example, a video pertaining to a specific type of game, or a video pertaining to a game executed in a specific operation mode, or a video pertaining to a game executed for a specific purpose. Here, a game being executed in a "specific operation mode" may mean, for example, that the game is performed under specific rules, or that the game is executed to carry out a specific mission pertaining to the game. Also, a game being executed for a "specific purpose" may mean, for example, that the game is executed at a specific event, such as a specific game tournament, or that the game is executed by a specific user, such as a member of a specific group.

In the above aspect, a "specific commercial item" may mean, for example, a specific product (goods), or a specific service.

In addition, in the above aspect, the "specific advertisement" may be, for example, a still image pertaining to a specific commercial item, the still image being incorporated into a game video; a video pertaining to a specific commercial item, the video being incorporated into a game video; an audio pertaining to a specific commercial item, the audio being incorporated into a game video; a still image pertaining to a specific commercial item, the still image being displayed separately from the game video on a display section provided on the terminal apparatus on which the game video is displayed; a video pertaining to a specific commercial item, the video being displayed separately from the game video on the display section; an audio pertaining to a specific commercial item, the audio being produced separately from the game video in the terminal apparatus; or at least one of these.

APPENDIX 2

A recording medium according to another aspect of the present invention is the recording medium recited in Appendix 1, and the deliverer is configured to, in response to the acquirer acquiring the video information and the specific information from the game apparatus, carry out processing to deliver the game video to the terminal apparatus after incorporating the specific advertisement into the game video indicated by the video information.

In this aspect, the deliverer is configured to incorporate a specific advertisement related to a specific commercial item into the game video. Therefore, according to this aspect, compared to a form in which an advertisement is displayed in an area of the terminal apparatus different from the area in which the game video is displayed, it is possible to have viewers of the game video who are interested in the progress of the game realize that the specific advertisement is present, and to make the viewers interested in the specific commercial item. Also, in this aspect, the deliverer is configured to incorporate a specific advertisement into the game video. That is, in the present aspect, the deliverer is able to, for example, incorporate a specific advertisement into a game video in a manner that does not interfere with the visibility of the game video by the viewers of the game video. Therefore, according to the present aspect, compared to a form in which an advertisement is displayed as a pop-up overlaid on the game video, for example, it is possible to reduce discomfort caused by the advertisement for the viewers of the game video.

APPENDIX 3

A recording medium according to another aspect of the present invention is the recording medium recited in Appendix 1 or 2. In a case in which a plurality of candidate commercial items being candidates for the specific commercial item (e.g., commercial items corresponding to advertisements ID indicated by the advertisement information to be delivered JY) are present for the specific commercial item, the deliverer is configured to, based on attribute information (e.g., viewer information) indicating an attribute of a user of the terminal apparatus, select the specific commercial item from among the plurality of candidate commercial items.

In this aspect, the deliverer selects a specific commercial item from a plurality of candidate commercial items based on the attribute information, to deliver a specific advertisement pertaining to the specific commercial item. Thus, in this aspect, the deliverer is able to deliver an advertisement through which an advertising effect may be attained with respect to a user of the terminal apparatus.

APPENDIX 4

A delivery system according to one aspect of the present invention is a delivery system (e.g., video delivery system Sys) that includes a game apparatus capable of executing a game; and a server apparatus communicable with the game apparatus and configured to deliver a video to a terminal apparatus. The game apparatus is configured to: generate video information indicating a game video of the game; and with the game video being a specific video, generate specific information indicating that the game video is the specific video, the server apparatus includes: an acquirer configured to acquire the video information and the specific information from the game apparatus; and a deliverer configured to deliver the game video indicated by the video information to the terminal apparatus, and the deliverer is configured to, in response to the acquirer acquiring the video information and the specific information from the game apparatus, deliver to the terminal apparatus a specific advertisement for a specific commercial item associated with the specific video.

In this aspect, the deliverer acquires, from the game apparatus, specific information indicating that the game video is a specific video associated with a specific advertisement. Thus, in this aspect, the deliverer is able to limit the delivery of an advertisement not related to the game video to the terminal apparatus.

APPENDIX 5

A delivery system according to another aspect of the present invention is the delivery system recited in Appendix 4, and the specific information includes game identification information (e.g., a game ID) for identifying a game executed by the game apparatus.

In this aspect, the deliverer acquires, from the game apparatus, specific information for identifying a game. Thus, in this aspect, the deliverer is able to identify, from among a plurality of videos that the deliverer can deliver, a video of the game in which a specific advertisement for a specific commercial item should be delivered.

APPENDIX 6

A delivery system according to another aspect of the present invention is the delivery system recited in Appendix 4. The game apparatus is capable of executing the game in a plurality of operation modes corresponding to a plurality types of rules, and the specific information includes mode identification information (e.g., a mode ID) for identifying an operation mode executed by the game apparatus.

In this aspect, the deliverer acquires, from the game apparatus, specific information for identifying an operation mode of the game. Thus, in this aspect, the deliverer is able to identify, from among a plurality of videos that the deliverer can deliver, a video of the game that is being executed by the operation mode in which a specific advertisement pertaining to a specific commercial item should be delivered.

APPENDIX 7

A server apparatus according to an aspect of the present invention is a server apparatus that delivers a video to a terminal apparatus, the server apparatus being communicable with a game apparatus capable of executing a game, and the server apparatus includes: an acquirer configured to acquire, from the game apparatus, video information indicating a game video of the game; and a deliverer configured to deliver to the terminal apparatus the game video indicated by the video information, and with the game apparatus having generated specific information indicating that the game video is a specific video, the deliverer is configured to deliver to the terminal apparatus a specific advertisement for a specific commercial item associated with the specific video in response to the acquirer acquiring the video information and the specific information from the game apparatus.

In this aspect, the deliverer acquires, from the game apparatus, specific information indicating that the game video is a specific video associated with a specific advertisement. Thus, in this aspect, the deliverer is able to limit delivery of an advertisement not related to the game video delivered to the terminal apparatus.

APPENDIX 8

A control method for a server apparatus in accordance with one aspect of the present invention is a control method for a server apparatus that delivers a video to a terminal apparatus, the server apparatus being communicable with a game apparatus capable of executing a game. The method includes: causing a processor of the server apparatus to function as: an acquirer configured to acquire, from the game apparatus, video information indicating a game video of the game; and a deliverer configured to deliver, to the terminal apparatus, the game video indicated by the video information, and with the game apparatus having generated specific information indicating that the game video is a specific video, the deliverer is configured deliver to the terminal apparatus a specific advertisement for a specific commercial item associated with the specific video in response to the acquirer acquiring the video information and the specific information from the game apparatus.

In this aspect, the deliverer acquires, from the game apparatus, specific information indicating that the game video is a specific video associated with a specific advertisement. Thus, in this aspect, the deliverer is able to limit delivery of an advertisement not related to the game video delivered to the terminal apparatus.

DESCRIPTION OF REFERENCE SIGNS

10 . . . game apparatus, 30 . . . delivery server, 70-$m$ . . . terminal apparatus, 300 . . . controller, 310 . . . acquirer, 320 . . . deliverer, 3000 . . . processor, Sys . . . video delivery system.

What is claimed is:

1. A non-transitory computer-readable recording medium storing a program executable by one or more processors of a server apparatus that delivers a video to a terminal apparatus and is communicable with a game apparatus that executes a game, to perform a method of:
   acquiring, from a game apparatus that executes a game, video information indicating a game video of the game;
   determining, based on specific information, a specific advertisement for a specific commercial item to be the advertisement to be delivered to the terminal apparatus;
   wherein the specific information is generated by the game apparatus, includes at least a game ID and a mode ID, or information indicating that none of the game ID nor the mode ID is included in the specific information, and indicates that the game video is a specific video;
   wherein the specific commercial item is associated with the specific video; and
   delivering, to the terminal apparatus, the game video indicated by the video information,
   wherein the delivering includes delivering to the terminal apparatus the specific advertisement in response to acquiring the video information and the specific information from the game apparatus.

2. The recording medium according to claim 1, wherein the delivering includes, in response to acquiring the video information and the specific information from the game apparatus, carrying out processing to deliver the game video to the terminal apparatus after incorporating the specific advertisement into the game video indicated by the video information.

3. The recording medium according to claim 1, wherein in a case in which a plurality of candidate commercial items, being candidates for the specific commercial item, are present for the specific commercial item, the delivering includes, based on attribute information indicating an attribute of a user of the terminal apparatus, selecting the specific commercial item from among the plurality of candidate commercial items.

4. A delivery system comprising:
a game apparatus that executes a game; and
a server apparatus communicable with the game apparatus and configured to deliver a video to a terminal apparatus,
the game apparatus including:
one or more apparatus memories; and
one or more apparatus processors communicatively connected to the one or more apparatus memories and configured to execute instructions to:
generate video information indicating a game video of the game; and
with the game video being a specific video, generate specific information, wherein the specific information includes at least a game ID and a mode ID, or information indicating that none of the game ID nor mode ID is included in the specific information, and indicates that the game video is a specific video, and
the server apparatus including:
one or more server memories; and
one or more server processors communicatively connected to the one or more server memories and configured to execute instructions to:
acquire the video information and the specific information from the game apparatus;
determine, based on the specific information, a specific advertisement for a specific commercial item to be the advertisement to be delivered to the terminal apparatus;
wherein the specific commercial item is associated with the specific video; and
deliver the game video indicated by the video information to the terminal apparatus,
wherein in response to acquiring the video information and the specific information from the game apparatus, the one or more server processors further execute the instructions to, in delivery of the game video, deliver to the terminal apparatus the specific advertisement.

5. The delivery system according to claim 4, wherein the specific information includes game identification information for identifying a game executed by the game apparatus.

6. The delivery system according to claim 4, wherein:
the one or more apparatus processors execute the instructions to execute the game in one of a plurality of types of operation modes that correspond to a plurality of types of rules, and
the specific information includes mode identification information for identifying the type of operation mode executed by the game apparatus.

7. The method of claim 1, wherein the delivering further includes delivering to the terminal apparatus a banner image; and
wherein the specific advertisement and banner image are positioned in separate areas of a video delivery screen connected to the terminal apparatus.

8. The method of claim 7, wherein the banner image includes link information indicating an address of a website pertaining to the specific commercial item.

9. The method of claim 1, wherein the specific advertisement includes audio.

10. The method of claim 1, wherein the specific information includes status information indicating a position, shape, orientation, movement speed, and moving direction of one or more game elements.

11. The delivery system according to claim 4, wherein the delivering further includes delivering to the terminal apparatus a banner image; and
wherein the specific advertisement and banner image are positioned in separate areas of a video delivery screen connected to the terminal apparatus.

12. The delivery system according to claim 11, wherein the banner image displays link information indicating an address of a website pertaining to the commercial item.

13. The delivery system according to claim 4, wherein the specific advertisement includes audio.

14. The delivery system according to claim 4, wherein the specific information includes status information indicating a position, shape, orientation, movement speed, and moving direction of one or more game elements.

15. The method of claim 1, wherein the specific information includes at least a game ID, a mode ID, and a tournament ID, or information indicating that none of the game ID, mode ID, or tournament ID are included in the specific information.

16. A control method for a server apparatus that delivers a video to a terminal apparatus, the server apparatus having one or more server processors and being communicable with a game apparatus that executes a game, the control method comprising:
causing the one or more server processors to acquire, from the game apparatus, video information indicating a game video of the game; and
causing the one or more server processors to deliver, to a terminal apparatus, the game video indicated by the video information,
the control method further comprising causing the one or more server processors to,
determine, based on specific information, a specific advertisement for a specific commercial item to be the advertisement to be delivered to the terminal apparatus;
wherein the specific information is generated by the game apparatus, includes at least a game ID and a mode ID, or information indicating that none of the game ID nor mode ID is included in the specific information, and indicates that the game video is a specific video;
wherein the specific commercial item is associated with the specific video; and
deliver to the terminal apparatus, in delivery of the game video, the specific advertisement in response to acquiring the video information and the specific information from the game apparatus.

17. The control method according to claim 16, wherein the delivering further includes delivering to the terminal apparatus a banner image; and
wherein the specific advertisement and banner image are positioned in separate areas of a video delivery screen connected to the terminal apparatus.

18. The control method according to claim 16, wherein the specific information includes status information indicating a position, shape, orientation, movement speed, and moving direction of one or more game elements.

19. The control method according to claim 16, wherein the specific advertisement includes audio.

20. The control method according to claim 17, wherein the banner image includes link information indicating an address of a website pertaining to the specific commercial item.

\* \* \* \* \*